US012523552B2

(12) United States Patent
Zannier et al.

(10) Patent No.: US 12,523,552 B2
(45) Date of Patent: Jan. 13, 2026

(54) TOUCHPAD FORCE CALCULATION

(71) Applicant: Microsoft Technology Licensing, LLC, Redmond, WA (US)

(72) Inventors: Federico Zannier, Seattle, WA (US); Lalit Anil Palve, Seattle, WA (US); Rhishikesh Ashok Sathe, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 18/320,940

(22) Filed: May 19, 2023

(65) Prior Publication Data

US 2024/0385059 A1    Nov. 21, 2024

(51) Int. Cl.
*G01L 1/14* (2006.01)
*G01L 5/22* (2006.01)
*G06F 3/041* (2006.01)

(52) U.S. Cl.
CPC .............. *G01L 1/14* (2013.01); *G01L 5/22* (2013.01); *G06F 3/04142* (2019.05); *G06F 3/04144* (2019.05)

(58) Field of Classification Search
CPC ............ G01L 1/14; G01L 5/22; G01L 1/142; G01L 1/044; G06F 3/04142; G06F 3/04144; G06F 2203/04105; G06F 3/03547; G06F 3/0446
USPC .................................................. 73/862.626
See application file for complete search history.

(56) References Cited

U.S. PATENT DOCUMENTS

| 9,229,592 | B2 | 1/2016 | Bulea | |
| 9,471,169 | B2* | 10/2016 | Schediwy | G06F 3/0412 |
| 9,671,898 | B2 | 6/2017 | Hsieh | |
| 9,746,952 | B2 | 8/2017 | Huie | |
| 10,068,728 | B2 | 9/2018 | Huska et al. | |
| 10,133,377 | B2 | 11/2018 | Kim et al. | |
| 10,459,542 | B1 | 10/2019 | Costante | |
| 10,613,695 | B2* | 4/2020 | Chen | G06F 3/0443 |
| 10,635,248 | B2* | 4/2020 | Hinson | G01L 1/142 |
| 10,866,642 | B2 | 12/2020 | Rosenberg | |
| 11,281,330 | B2* | 3/2022 | Rosenberg | G06F 3/041662 |

(Continued)

FOREIGN PATENT DOCUMENTS

| EP | 1840715 A2 | 10/2007 |
| KR | 101939280 B1 | 1/2019 |

OTHER PUBLICATIONS

Suen, et al., "Capacitive Tactile Sensor with Concentric-Shape Electrodes for Three-Axial Force Measurement", In Publication of MDPI, Dec. 19, 2018, 5 Pages.

(Continued)

*Primary Examiner* — Marrit Eyassu
(74) *Attorney, Agent, or Firm* — Alleman Hall & Tuttle LLP

(57) ABSTRACT

Methods for estimating a force F exerted on a touchpad are disclosed. In one example, a force sensing touchpad comprises a printed circuit board (PCB) comprising four PCB electrodes and a spring spaced from the PCB and comprising four spring electrodes. Changes in capacitance at two of the PCB electrodes are determined and used to calculate a first local gradient between the two electrodes. Changes in capacitance at the other two PCB electrodes are determined and used to calculate a second local gradient between these two electrodes. The local gradients are used to calculate local forces at each PCB electrode, and the local forces are used to calculate the force F exerted on the touchpad.

20 Claims, 11 Drawing Sheets

(56) References Cited

U.S. PATENT DOCUMENTS

| | | | |
|---|---|---|---|
| 11,635,847 | B2 | 4/2023 | Rosenberg |
| 11,726,597 | B1 | 8/2023 | Peretz |
| 11,768,542 | B1 | 9/2023 | Dani |
| 2006/0012944 | A1 | 1/2006 | Mamigonians |
| 2009/0260897 | A1 | 10/2009 | Kruse |
| 2010/0200309 | A1 | 8/2010 | Yilmaz |
| 2011/0011650 | A1 | 1/2011 | Klinghult |
| 2014/0307207 | A1 | 10/2014 | Ge et al. |
| 2015/0130730 | A1 | 5/2015 | Harley |
| 2015/0198844 | A1 | 7/2015 | Choi et al. |
| 2015/0227256 | A1 | 8/2015 | Hsieh |
| 2016/0266682 | A1* | 9/2016 | Fu .................. G06F 3/0416 |
| 2016/0378259 | A1 | 12/2016 | Schediwy et al. |
| 2017/0153737 | A1 | 6/2017 | Chawda et al. |
| 2017/0249049 | A1 | 8/2017 | Wang et al. |
| 2017/0336904 | A1 | 11/2017 | Hsieh |
| 2018/0188843 | A1 | 7/2018 | Wang et al. |
| 2018/0190722 | A1 | 7/2018 | Lai et al. |
| 2019/0212842 | A1 | 7/2019 | Hinson et al. |
| 2020/0064952 | A1 | 2/2020 | Gupta |
| 2020/0150767 | A1 | 5/2020 | Karimi Eskandary |
| 2020/0278747 | A1 | 9/2020 | Ligtenberg et al. |
| 2021/0278966 | A1 | 9/2021 | Rosenberg |
| 2022/0164102 | A1 | 5/2022 | Rosenberg et al. |
| 2022/0350429 | A1 | 11/2022 | Ghioni et al. |
| 2023/0324995 | A1 | 10/2023 | Rosenberg |

OTHER PUBLICATIONS

"Capacitive Touch Hardware Design and Layout Guidelines for Synergy, RX200, and RX100", Retrieved from: https://www.renesas.com/in/en/document/apn/capacitive-touch-hardware-design-and-layout-guidelines-synergy-rx200-and-rx100-application-note?language=en, Jun. 14, 2017, 20 Pages.

"Design with Surface Sensors for Touch Sensing Applications on MCUs", Retrieved from: https://www.st.com/resource/en/application_note/dm00087990-design-with-surface-sensors-for-touch-sensing-applications-on-mcus-stmicroelectronics.pdf, Aug. 2021, 32 Pages.

Corrected Notice of Allowance mailed on Jul. 18, 2023, in U.S. Appl. No. 17/827,115, 5 pages.

Corrected Notice of Allowance mailed on Mar. 28, 2023, in U.S. Appl. No. 17/827,115, 6 pages.

International Search Report and Written Opinion Issued in PCT Application No. PCT/US23/015986, mailed on Jun. 28, 2023, 12 Pages.

Non-Final Office Action Issued in U.S. Appl. No. 17/827,115, mailed on Nov. 10, 2022, 7 Pages.

Notice of Allowance Issued in U.S. Appl. No. 17/827,115, mailed on Mar. 15, 2023, 10 Pages.

Non-Final Office Action mailed on Feb. 26, 2024, in U.S. Appl. No. 18/320,926, 10 pages.

Notice of Allowance mailed on May 23, 2024, in U.S. Appl. No. 18/320,926, 8 pages.

Dempsey, et al., "Tactile sensing in human-computer interfaces: The inclusion of pressure sensitivity as a third dimension of user input", Sensors and Actuators A: Physical, vol. 232, Jun. 3, 2015, pp. 229-250.

International Search Report and Written Opinion received for PCT Application No. PCT/US2024/028217, mailed on Sep. 13, 2024, 16 pages.

International Search Report and Written Opinion received for PCT Application No. PCT/US2024/028219, Aug. 29, 2024, 15 pages.

\* cited by examiner

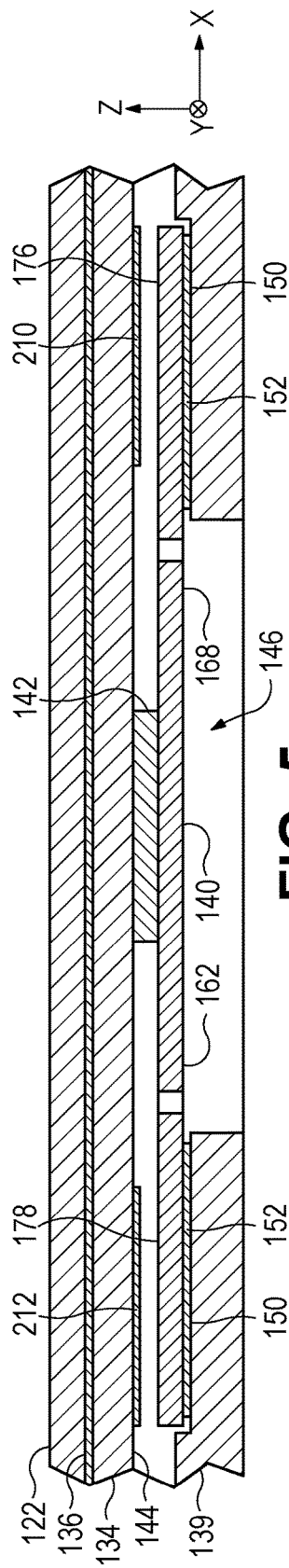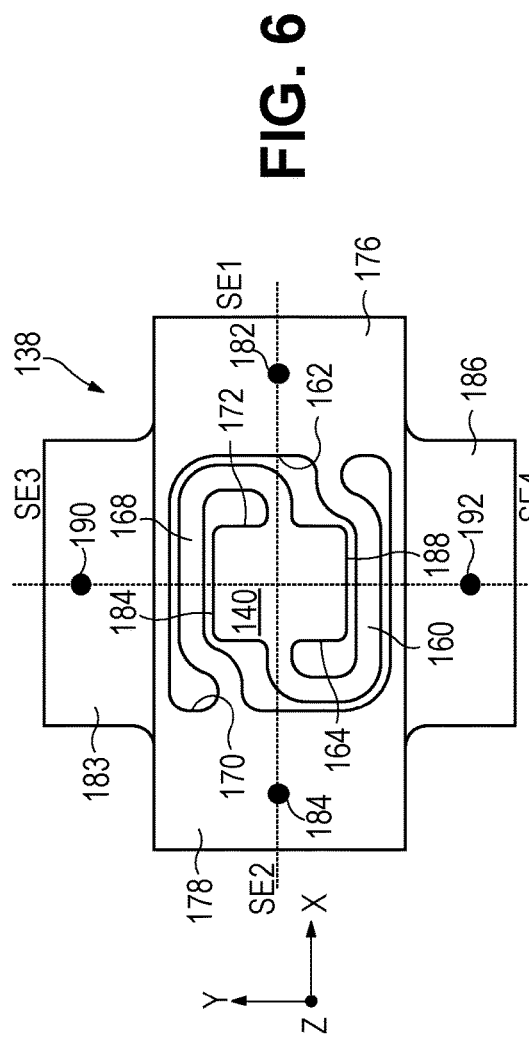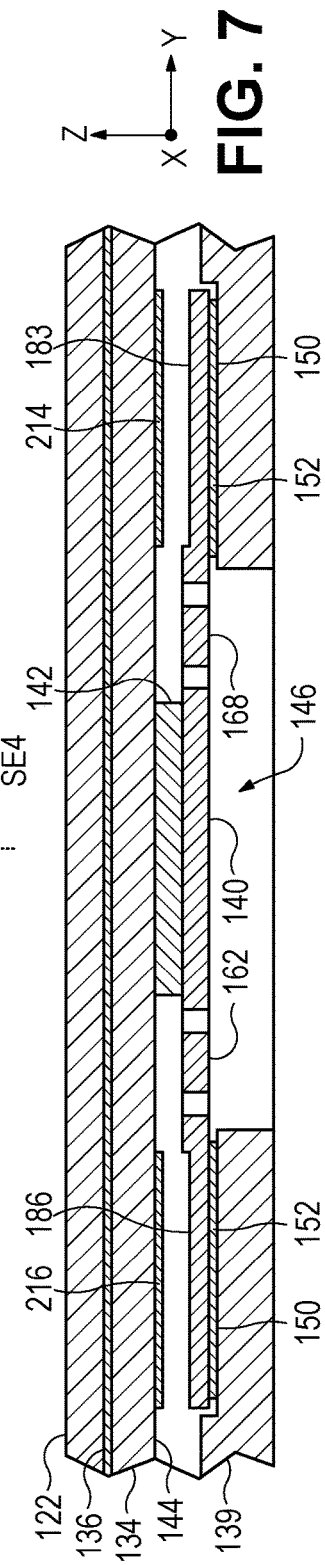

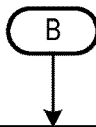

Wherein a first current distance between the PCB and the base plate at the first PCB electrode is $d_{01}$, the first PCB electrode is spaced from a first spring electrode of the four spring electrodes by a first distance $d_1$, the second PCB electrode is spaced from a second spring electrode of the four spring electrodes by approximately the first distance $d_1$, a second current distance between the PCB and the base plate at the third PCB electrode is $d_{02}$, the third PCB electrode is spaced from a third spring electrode of the four spring electrodes by a second distance $d_2$ that is greater than $d_1$, and the fourth PCB electrode is spaced from a fourth spring electrode of the four spring electrodes by approximately the second distance $d_2$, wherein $d_2 - d_1 = d_{step}$,
calculating a first expected capacitance CaPE1 at the first PCB electrode in response to the force F and based at least in part on the first change in capacitance $\Delta C_{H1}$ at the first PCB electrode, $d_{01}$, and $d_{step}$ 318

Calculating a second expected capacitance CaPE2 at the second PCB electrode in response to the force F and based at least in part on the second change in capacitance $\Delta C_{H2}$ at the second PCB electrode, $d_{01}$, and $d_{step}$ 320

Calculating a third expected capacitance CaPE3 at the third PCB electrode in response to the force F and based at least in part on the third change in capacitance $\Delta C_{H3}$ at the third PCB electrode and $d_{02}$ 322

Calculating a fourth expected capacitance CaPE4 at the fourth PCB electrode in response to the force F and based at least in part on the fourth change in capacitance $\Delta C_{H4}$ at the fourth PCB electrode and $d_{02}$ 324

Estimating a first corrected distance $d_{01C}$ between the PCB and the base plate at the first PCB electrode based at least in part on the first expected capacitance CaPE1 at the first PCB electrode and first local gradient $G_1$ 326

Estimating a second corrected distance $d_{02C}$ between the PCB and the base plate at the third PCB electrode based at least in part on the third expected capacitance CaPE3 at the third PCB electrode and second local gradient $G_2$ 328

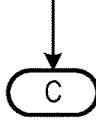

FIG. 9B

Wherein the first spring electrode and the second spring electrode each comprise centroids aligned on a first axis, and the third spring electrode and the fourth spring electrode each comprise centroids aligned on a second axis perpendicular to the first axis 342

Wherein the spring is mounted on a base plate that defines an aperture, the spring overlies the aperture and comprises:
    a first beam extending from a first internal wall to a second side of a central portion that overlies the aperture; and
    a second beam extending from a second internal wall that is opposite to the first internal wall to a first side of the central portion that is opposite to the second side 344

Wherein the first spring electrode, second spring electrode, third spring electrode, and fourth spring electrode are integral portions of the spring 346

Wherein the first spring electrode, second spring electrode, third spring electrode, and fourth spring electrode are separate components affixed to the spring 348

FIG. 9D

TOUCHPAD FORCE CALCULATION

BACKGROUND

Some computing devices include a force sensing touchpad for receiving user inputs. In some of these devices, the touchpad utilizes capacitance measurements to estimate a force applied to the touchpad.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed relating to methods for estimating a force F exerted on the touchpad in a computing device. In one example, the touchpad comprises a printed circuit board (PCB) comprising four PCB electrodes and a spring spaced from the PCB and comprising four spring electrodes, with the spring mounted on a base plate. A method for estimating a force F exerted on the touchpad comprises determining a first change in capacitance $\Delta C_{H1}$ at a first PCB electrode in response to the force F and a second change in capacitance $\Delta C_{H2}$ at a second PCB electrode in response to the force F. A first local gradient $G_1$ between the first PCB electrode and the second PCB electrode is calculated using at least the first change in capacitance $\Delta C_{H1}$ and the second change in capacitance $\Delta C_{H2}$. At least the first local gradient $G_1$ is used to calculate a first local force at the first PCB electrode and a second local force at the second PCB electrode.

The method includes determining a third change in capacitance $\Delta C_{H3}$ at a third PCB electrode in response to the force F and a fourth change in capacitance $\Delta C_{H4}$ at a fourth PCB electrode in response to the force F. At least the third change in capacitance $\Delta C_{H3}$ and the fourth change in capacitance $\Delta C_{H4}$ are used to calculate a second local gradient $G_2$ between the third PCB electrode and the fourth PCB electrode. At least the second local gradient $G_2$ is used to calculate a third local force at the third PCB electrode and a fourth local force at the fourth PCB electrode. The force F exerted on the touchpad is then calculated using at least the first local force, the second local force, the third local force, and the fourth local force.

BRIEF DESCRIPTION OF THE DRAWINGS

FIG. 5 is a schematic cross section of the touchpad of FIG. 3 taken along line 5-5.

FIG. 6 is a top view of one spring of the touchpad of FIG. 3.

FIG. 7 is a schematic cross section of the touchpad of FIG. 3 taken along line 7-7.

FIGS. 9A-9D are a flow chart of a method for estimating a force F exerted on a touchpad according to examples of the present disclosure.

DETAILED DESCRIPTION

Figure 1:
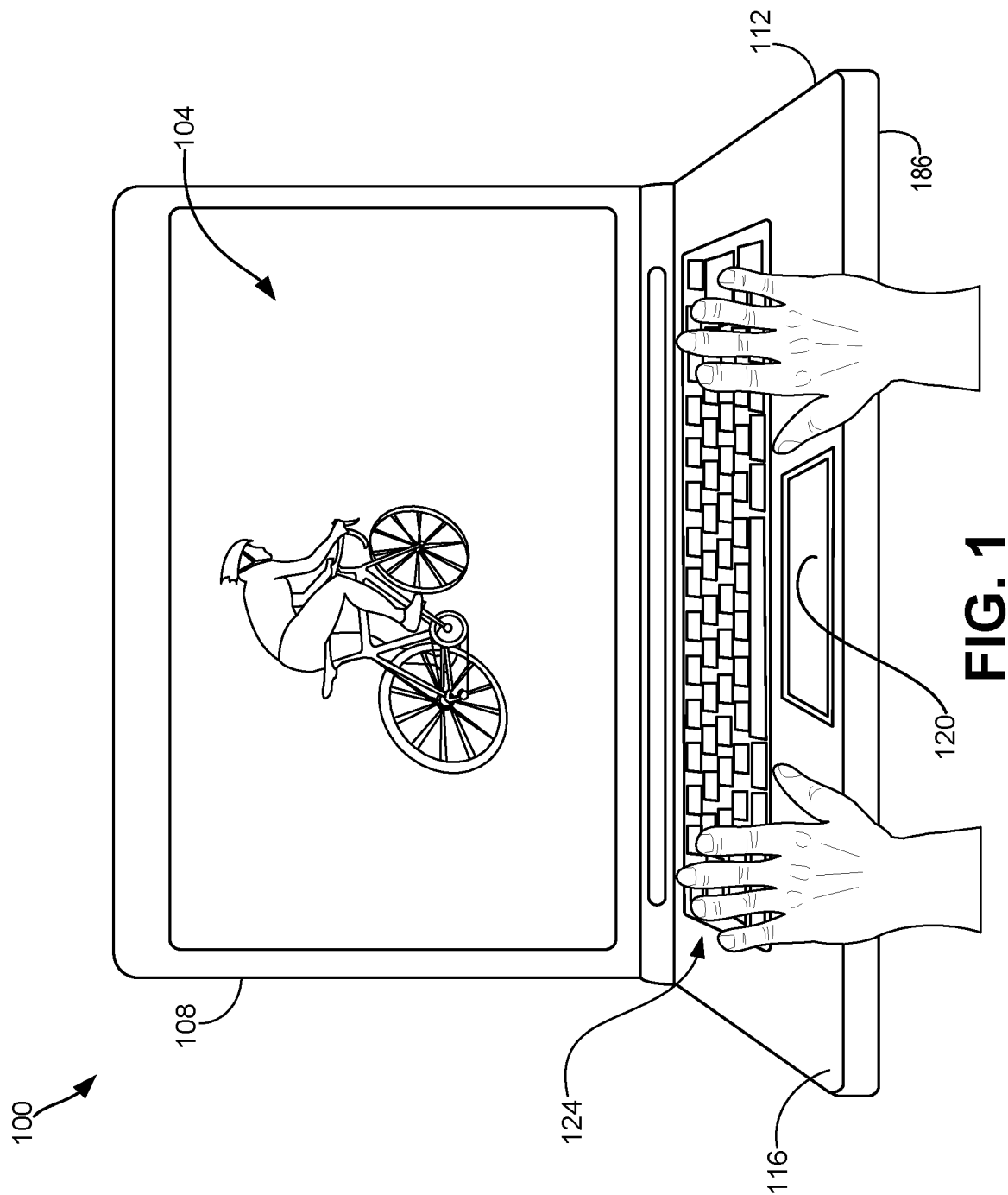
FIG. 1 shows one example of a computing device utilizing a touchpad according to examples of the present disclosure.

Some computing devices include a touchpad for receiving user inputs. In some of these devices, the touchpad utilizes capacitance measurements to estimate a force applied to the touchpad. For example, in some devices a printed circuit board (PCB) is configured on a cover glass assembly and supported by one or more cantilever springs over a bucket connected to electrical ground. One or more sensing pads (electrodes) are located between the PCB and the bucket. In such implementations, the capacitance between the sensing pads and the grounded bucket is a function of the distance between the sensing pads and the bucket.

In these examples, a capacitive force transducer can utilize displacement as a proxy for force. In such a parallel plate capacitor model, the capacitance is equal to the area of the electrode divided by the distance between the sensing pads and the bucket. When a force applied to the cover glass assembly compresses the spring and reduces this distance, the capacitance changes. In this model, the capacitance is directly proportional to the applied force.

In one example, where the area of an electrode is represented by $A_{pad}$, the initial distance between the electrode and the bucket is $d_0$, and the change in the distance as a result of a force F applied by a user is $d(F)=F/K$, the capacitance as a result of the Force F is given by the equation:

$$\text{Capacitance (Force)} = \varepsilon \frac{A_{pad}}{d_0 - d(F)} = \varepsilon \frac{A_{pad}}{d_0 - \frac{F}{K}},$$

where K is the spring constant of the spring between the PCB and the bucket, F is the force applied by the user on the touchpad, and $\varepsilon$ is the permittivity of the medium in the gap between the electrode and the bucket. In this manner, a measured change in capacitance can be used to calculate the magnitude of the applied force F.

In some examples, the initial distance between the electrode and the bucket $d_0$ is determined at the time of manufacturing. Over time, component wear, environmental aspects, and other factors can cause the initial distance d0 to change. In these examples, continuing to use the initial distance d0 to determine the force applied on the PCB as a function of the change in capacitance can result in errors.

To address these issues, in some examples a touchpad utilizes differential capacitive sensing to periodically recalibrate the distance $d_0$ over the life of a device. As described further below, touchpads that utilize differential capacitive sensing techniques include two or more linearly-aligned electrodes that are located different distances from a corresponding PCB electrode. Because the distances are different, the capacitance between each electrode and its corresponding PCB electrode is also different. This differential capacitance between the electrodes can be used to periodically recalibrate the base height $d_0$ of the touchpad, regardless of changes in the base height $d_0$ from its initial value.

However, touchpads that utilize differential capacitive sensing can include components such as PCBs, buckets, and other structures that can bend under applied forces. Component aging, environmental factors, and manufacturing variabilities also can affect a component's bending behavior. Such component bending can introduce errors in the calculation of the force F exerted on the touchpad.

Accordingly, and as described in more detail below, configurations of the present disclosure provide touchpad configurations and related methods for estimating a force F exerted on a touchpad that accommodate for bending of touchpad components and correspondingly reduce errors associated with such bending. As described in more detail below, touchpads and computing devices of the present disclosure utilize a printed circuit board (PCB) comprising four PCB electrodes and four corresponding spring electrodes arranged in a cross pattern. A local gradient is calculated between each pair of PCB electrodes and utilized to calculate local forces at each PCB electrode. The local forces are used to calculate the force F exerted on the touchpad.

With reference now to FIGS. 1-4 and 10, an example computing device 100 in the form of a laptop computer that includes a force sensing touchpad for estimating a force F exerted on the touchpad according to aspects of the present disclosure is illustrated. In other examples, force sensing touchpads of the present disclosure can be implemented in tablet computing devices, foldable computing devices including multiple touch screens, wearable and other mobile computing devices, and any other type of computing device that utilizes a touchpad.

In this example computing device 100 includes a touch screen display 104 on a display substrate 108 that is rotatably coupled to a chassis 112. The chassis 112 includes a user interaction surface 116 that comprises a force sensing touchpad 120 and keyboard 124, and an opposing rear cover 186. In different examples a user provides touch inputs to the touchpad 120 by touching the touchpad with one or more digits of the user's hand.

Touchpad 120 is configured to detect the position and force of a user's finger(s) and/or thumb. In some examples the touchpad 120 is a mutual capacitance touchpad. In these examples, touch inputs are identified by sampling capacitance between a driving electrode and a sensing electrode. Driving electrodes are arranged in an array within the touchpad 120. Touch detection signals are provided to each of the electrodes at a different frequency and/or at a different time. Conductive materials, such as a user's finger, draw current away from the driving electrodes when providing a touch input. The touch input can be identified by detecting this current, and a location of the touch input can be reconstructed based at least in part on determining which driving electrodes were being driven when the touch input occurred, and the frequency of the touch detection signal driving each driving electrode. In other examples, touchpads employing other touch detection technologies, including but not limited to self-capacitance and projected capacitance touch detection, can be utilized.

Figure 2:
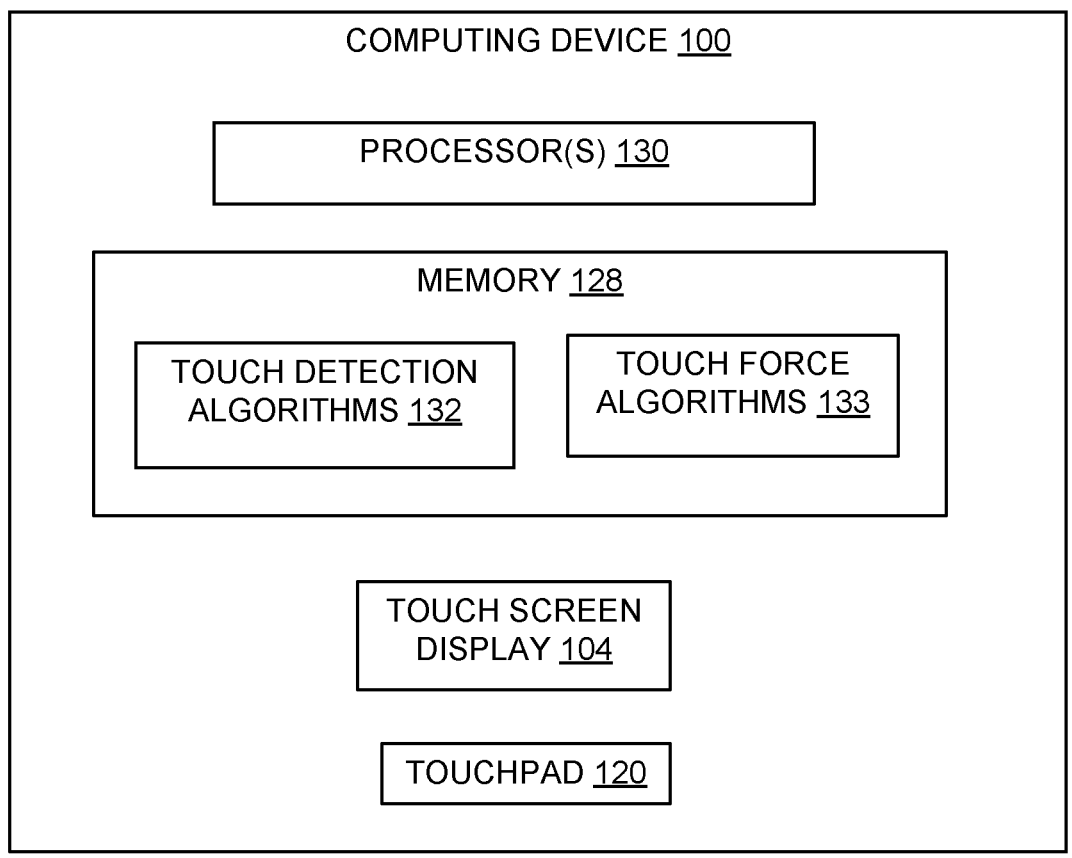
FIG. 2 shows a schematic view of selected components of the computing device of FIG. 1 according to examples of the present disclosure.
Figure 3:
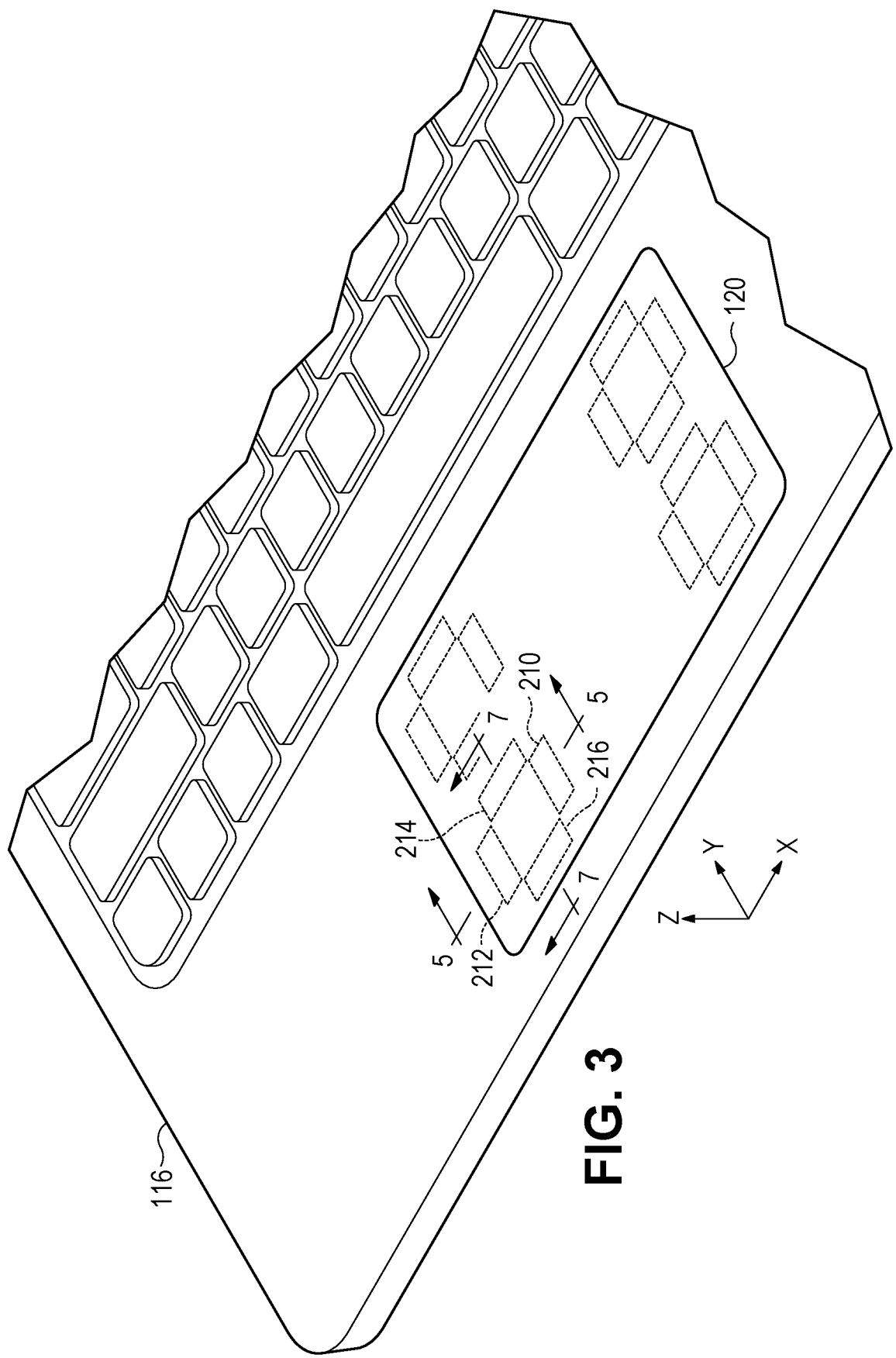
FIG. 3 shows a partial view of the computing device of FIG. 1.

With reference now to FIG. 2, a schematic view of selected components of the example computing device 100 of FIG. 1 is provided. Computing device 100 includes memory 128 that stores instructions executable by a processor 130. For example, the memory 128 stores instructions in the form of touch detection algorithms 132 executable by the processor 130 to perform touch detection on the touchpad 120 using signals received from the touchpad. Similarly and as described in more detail below, memory 128 stores instructions in the form of touch force algorithms 133 executable by the processor 130 to determine the force of a touch input on the touchpad 120. Additional details regarding memory 128, processor 130, and other components and subsystems of computing device 100 are described further below with reference to FIG. 10.

With reference now to FIGS. 3-8 and 10, in one example touchpad 120 includes a cover glass layer 122 affixed to a PCB 134 by an adhesive layer 136. The PCB 134 is supported by a plurality of springs 138 located on a base plate 139. In different examples the base plate can comprise a conductive material such as aluminum, a non-conductive material such as plastic, or combinations of the foregoing. In this example, the touchpad 120 utilizes four springs 138 to support the PCB 134 and provide capacitive force sensing as described further below. In other examples, touchpads of the present disclosure can utilize fewer or more springs.

With reference to the simplified cross section illustrated in FIG. 5, and as described in more detail below, each spring 138 comprises a central portion 140 that is resiliently supported by two beams extending from opposing internal walls of the spring. A spacer 142 is located between the central portion 140 and a lower metal layer 144 of the PCB 134 and is bonded to the central portion and/or the PCB 134. In some examples, the spacer 142 comprises a silicone bump that includes an embedded conductive bead that provides grounding of the spring 138 to facilitate capacitive measurements.

Figure 4:
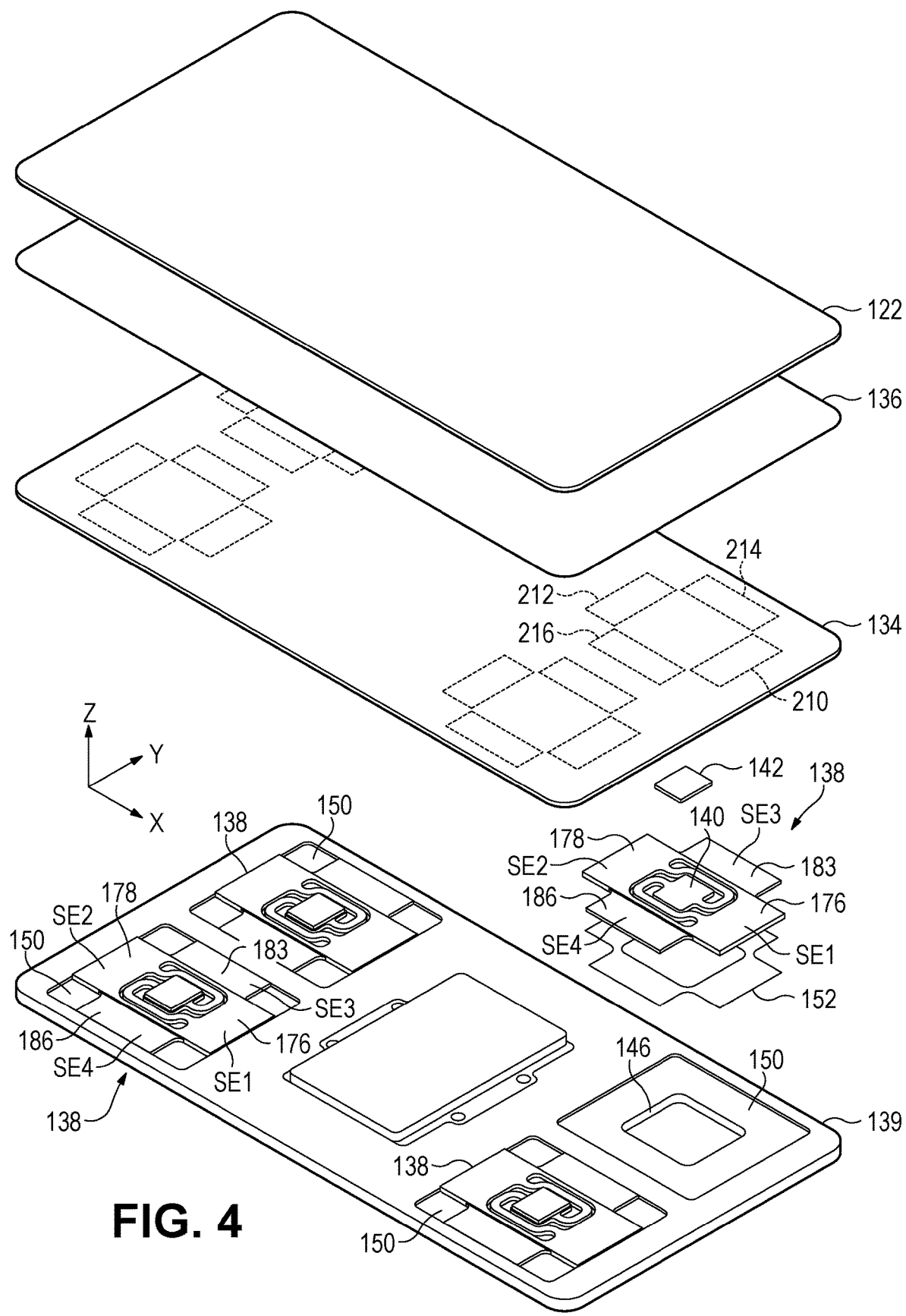
FIG. 4 shows an exploded view of the touchpad.

In this example the base plate 139 defines four apertures 146 that each correspond to one of the springs 138. As shown in FIGS. 4 and 5, at each aperture 146 the base plate 139 comprises a recessed shelf 150 that surrounds the aperture. A spring 138 is affixed to the recessed shelf 150 of the base plate 139 via a spring adhesive layer 152. As best seen in FIGS. 5 and 7, the central portion 140 of the spring 138 is positioned over a corresponding aperture 146 in the base plate 139. In this manner, each spring 138 resiliently supports the PCB 134 in a manner that enables the PCB to move in the z-axis direction in response to a force exerted on the cover glass layer 122.

With reference to FIG. 6, in this example each spring 138 comprises a first beam 160 extending from a first internal wall 162 to a second side 164 of the central portion 140 of the spring. In this example, the first beam 160 initially extends in the negative x-axis direction before curving approximately 180 degrees to extend in the positive x-axis direction into the second side 164 of the central portion 140. Each spring 138 also comprises a second beam 168 extending from a second internal wall 170 opposite the first internal wall 162 to a first side 172 of the central portion 140 opposite to the second side 164. The second beam 168 initially extends in the positive x-axis direction before curving approximately 180 degrees to extend in the negative x-axis direction into the second 172 of the central portion 140.

Each spring 138 comprises four spring electrodes within the footprint of the spring structure, with each spring electrode being spaced from an overlying PCB electrode located on the PCB 134 to enable capacitive force sensing utilizing displacements of the PCB 134. In the present example and with reference to FIGS. 5, 6 and 8A, each spring 138 comprises a first spring electrode 176 (SE1) located on the first side 172 of the central portion 140 of the spring, and a second spring electrode 178 (SE2) located on the second side 164 of the central portion 140 of the spring that is opposite to the first side. With reference to FIGS. 4 and 5, in this example the first spring electrode 176 (SE1) and the second spring electrode 178 (SE2) are affixed to the recessed shelf 150 of the base plate 139 via adhesive layer 152.

As illustrated in FIG. 6, a first centroid 182 of the first spring electrode 176 (SE1) and a second centroid 184 of the second spring electrode 178 (SE2) are aligned along the x-axis. In one potential advantage of this configuration and as described further below, aligning the centroids of these two spring electrodes enables an accurate calculation of a first local gradient G1 between corresponding first PCB electrode 210 (PE1) and the second PCB electrode 212 (PE2), which gradient can be used to more accurately calculate the force F exerted on the touchpad in a manner that compensates for bending of components.

Figure 8A:
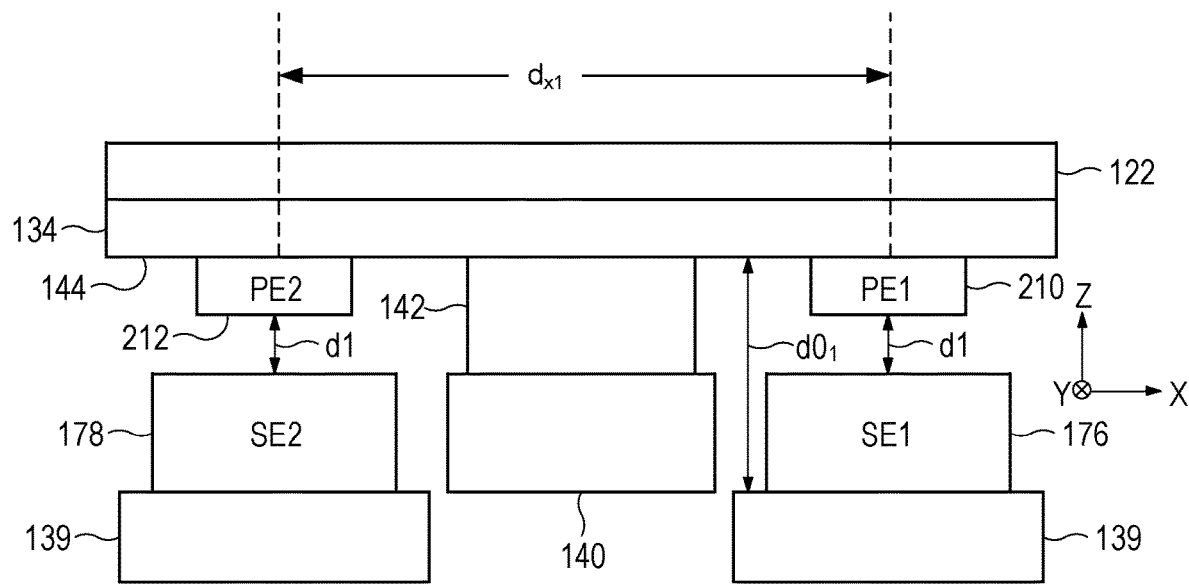
FIG. 8A is a simplified depiction of the cross section of FIG. 5.
Figure 8B:
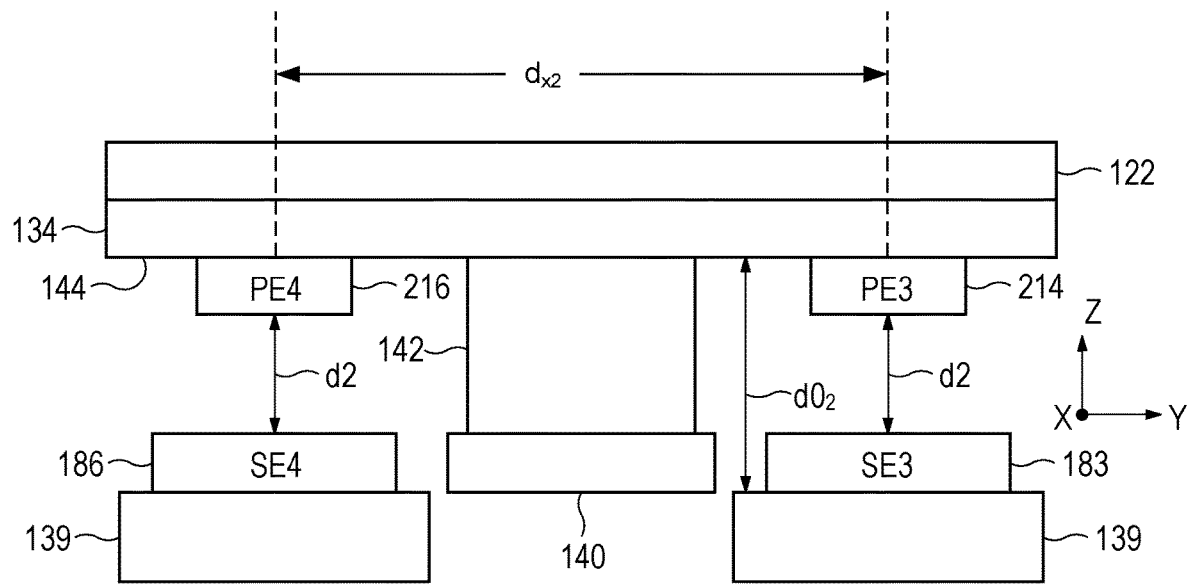
FIG. 8B is a simplified depiction of the cross section of FIG. 7.

In this example and with reference to FIGS. 6, 7, and 8B, each spring 138 also comprises a third spring electrode 183 (SE3) located on a third side 184 of the central portion 140 of the spring between the first side 172 and second side 164, and a fourth spring electrode 186 (SE4) located on a fourth side 188 of the central portion 140 of the spring that is opposite to the third side 184 and between the first side 172 and second side 164. With reference to FIGS. 4 and 7, in this example the third spring electrode 183 (SE3) and the fourth spring electrode 186 (SE4) are also affixed to the recessed shelf 150 of the base plate 139 via adhesive layer 152.

As with the first spring electrode 176 (SE1) and the second spring electrode 178 (SE2), the third spring electrode 183 (SE3) includes a third centroid 190 and the fourth spring electrode 186 (SE4) includes a fourth centroid 192 that are aligned along the y-axis perpendicular to the x-axis. Aligning the centroids of these two spring electrodes along the y-axis enables an accurate calculation of a second local gradient G2 between corresponding third PCB electrode 214 (PE3) and the fourth PCB electrode 216 (PE4), which gradient can be used to more accurately calculate the force F exerted on the touchpad. Further, in another potential advantage of the present disclosure and as described in more detail below, determining these orthogonal gradients G1 and G2 enables a more accurate calculation of the force F exerted on the touchpad 120 that accommodates for bending of touchpad components along both x- and y-axes, and correspondingly reduces errors associated with such bending.

Additionally, in another potential advantage of this example, the first spring electrode 176 (SE1), second spring electrode 178 (SE2), third spring electrode 183 (SE3), and fourth spring electrode 186 (SE4) are integral portions of the spring 138. Alternatively expressed, the spring 138 and each of its components are fabricated from one continuous workpiece of material, such as copper. In different examples, spring 138 can be fabricated via metalworking processes, additive manufacturing processes, or any other suitable process. In one potential advantage of this configuration, providing these four spring electrodes as integral portions of the spring 138 advantageously reduces the tolerance chain between these spring electrodes and corresponding PCB electrodes on the PCB 134.

In other examples, the first spring electrode 176 (SE1), second spring electrode 178 (SE2), third spring electrode 183 (SE3), and fourth spring electrode 186 (SE4) can be separate components that are affixed to the spring 138.

As described above, the PCB 134 includes four PCB electrodes that are each spaced from and overlying one of the four spring electrodes of the spring 138. In the present example and with reference to FIG. 8A, the first PCB electrode 210 (PE1) is located a first distance $d_1$ from the first spring electrode 176 (SE1), and the second PCB electrode 212 (PE2) is located approximately the same first distance $d_1$ from the second spring electrode 178 (SE2). The phrase "approximately the same first distance $d_1$" includes examples in which the second PCB electrode 212 (PE2) is located the same first distance $d_1$ from the second spring electrode 178 (SE2), and examples in which the second PCB electrode is located a distance from the second spring electrode that is just slightly different from the first distance $d_1$, such as 1-100 microns different, with such slight difference due to manufacturing tolerances, component wear over time, and/or other factors.

With reference now to FIG. 8B, the third PCB electrode 214 (PE3) is located a second distance $d_2$ from the third spring electrode 183 (SE3), and the fourth PCB electrode 216 (PE4) is located approximately the same second distance $d_2$ from the fourth spring electrode 186 (SE4), where the second distance $d_2$ is greater than the first distance $d_1$. The phrase "approximately the same second distance $d_2$" includes examples in which the fourth PCB electrode 216 (PE4) is located the same second distance $d_2$ from the fourth spring electrode 186 (SE4), and examples in which the fourth PCB electrode is located a distance from the fourth spring electrode that is just slightly different from the second distance $d_2$, such as 1-100 microns different, with such slight difference due to manufacturing tolerances, component wear over time, and/or other factors.

As best seen in FIG. 4 and the schematic cross-section of FIGS. 8A and 8B, in this example the third spring electrode 183 (SE3) and fourth spring electrode 186 (SE4) are stepped down in the z-axis direction with respect to the first spring electrode 176 (SE1) and second spring electrode 178 (SE2). In this manner, the second distance d2 between the third PCB electrode 214 (PE3) and the third spring electrode 183 (SE3) and between the fourth PCB electrode 214 (PE4) and the fourth spring electrode 183 (SE4) is greater than the first distance d1 between the first PCB electrode 210 (PE1) and the first spring electrode 176 (SE1) and between the second PCB electrode 212 (PE2) and the second spring electrode 178 (SE2), wherein the difference between the distances $d_1$ and $d_2$ is defined as a distance $d_{step}(d_2-d_1=d_{step})$.

With this configuration, in one potential advantage of the present disclosure and as described further below, because the first distance $d_1$ is different from the second distance $d_2$, a cross-capacitance differential capacitive force sensing technique can be utilized that advantageously corrects for bending errors along both the x-axis and the y-axis directions. Advantageously, this differential capacitance between the four pairs of electrodes can be used to calculate the force F exerted on the touchpad in a manner that reduces errors attributable to bending of the PCB 134, base plate 139, and/or other components.

With reference now to FIGS. 9A-9D, a flow diagram is provided depicting an example method 300 for estimating a force F exerted on a touchpad in a computing device according to examples of the present disclosure. The following description of method 300 is provided with reference to the touchpad 120 and related components described herein and shown in FIGS. 1-8B and 10. In this example, the method 300 is performed with a touchpad comprising a printed circuit board (PCB) comprising four PCB electrodes and a spring spaced from the PCB and comprising four spring electrodes. In other examples, the method 300 is performed with other touchpads and computing devices, and in other contexts using other suitable devices and components.

At 304 the method 300 includes determining a first change in capacitance $\Delta C_{H1}$ at the first PCB electrode 210 (PE1) of the four PCB electrodes in response to the force F and a second change in capacitance $\Delta C_{H2}$ at the second PCB electrode 212 (PE2) of the four PCB electrodes in response to the force F. At 306 the method 300 includes using at least the first change in capacitance $\Delta C_{H1}$ and the second change in capacitance $\Delta C_{H2}$ to calculate a first local gradient $G_1$ between the first PCB electrode 210 (PE1) and the second PCB electrode 212 (PE2). For example and with reference to FIG. 8A, as a user exerts a force F on the top glass layer 122 of the touchpad 120, the distance $d_1$ is reduced, which causes a change in the capacitances sensed at the first PCB electrode 210 (PE1) and second PCB electrode 212 (PE2). Advantageously and as described further below, the first local gradient $G_1$ can be utilized to correct for potential errors arising from component bending along the x-axis in calculating the force F using a cross-capacitance differential capacitive force sensing technique.

In one example and with reference to FIG. 8A, the first local gradient G1 between the first PCB electrode 210 (PE1) and the second PCB electrode 212 (PE2) can be determined using the following equation:

$$G1 = ((\Delta C_{H1} + \Delta C_{H2}) * d_{01}^2)/(K_a + ((\Delta C_{H1} + \Delta C_{H2}) * d_{01})/dx_1,$$

where $\Delta C_{H1}$ is the first change in capacitance at first PCB electrode 210 (PE1), $\Delta C_{H2}$ is the second change in capacitance at second PCB electrode 212 (PE2), $d_{01}$ is a first current distance between the metal layer 144 of PCB 134 and the base plate 139 at the first PCB electrode 210 (PE1), $dx_1$ is the distance between a first centroid of the first PCB electrode (PE1) and a second centroid of the second PCB electrode (PE2), and $K_a$ is a constant based on the area $A_{PE1}$ of the first PCB electrode 210 (PE1) (or second PCB electrode 212 (PE2) where the two areas are equal) and permittivity, namely, $K_a = eps0*er*A_{PE1}$, where $eps0$=permittivity of vacuum=8.854 187 8128(13)×10$^{-12}$ Fm$^{-1}$, and er=the relative permittivity of the gaps between the PCB and spring electrodes, such as er=1 for Air.

At 308 and as described further below, the method 300 includes using at least the first local gradient $G_1$ to calculate a first local force at the first PCB electrode 210 (PE1) and a second local force at the second PCB electrode 212 (PE2).

At 310, and similar the process for the first PCB electrode 210 (PE1) and second PCB electrode 212 (PE2), the method 300 includes determining a third change in capacitance $\Delta C_{H3}$ at the third PCB electrode 214 (PE3) in response to the force F and a fourth change in capacitance $\Delta C_{H4}$ at the fourth PCB electrode 216 (PE4) in response to the force. At 312 the method 300 includes using at least the third change in capacitance $\Delta C_{H3}$ and the fourth change in capacitance $\Delta C_{H4}$ to calculate a second local gradient $G_2$ between the third PCB electrode 214 (PE3) and the fourth PCB electrode 216 (PE4). For example and with reference to FIG. 8B, as a user exerts a force F on the top glass layer 122 of the touchpad 120, the distance $d_2$ is reduced, which causes a change in the capacitances sensed at the third PCB electrode 214 (PE3) and fourth PCB electrode 216 (PE4). Advantageously and as described further below, the second local gradient $G_2$ can be utilized to correct for potential errors arising from component bending along the y-axis in calculating the force F using a cross-capacitance differential capacitive force sensing technique.

In one example and with reference to FIG. 8B, the second local gradient $G_2$ between the third PCB electrode 214 (PE3) and the fourth PCB electrode 216 (PE4) can be determined using the following equation:

$$G2 = ((\Delta C_{H3} + \Delta C_{H4}) * d_{02}^2)/(K_b + ((\Delta C_{H3} + \Delta C_{H4}) * d_{02})/dx_2,$$

where $\Delta C_{H3}$ is the third change in capacitance at third PCB electrode 214 (PE3), $\Delta_{CH4}$ is the fourth change in capacitance at fourth PCB electrode 216 (PE4), $d_{02}$ is a second current distance between the metal layer 144 of the PCB 134 and the base plate 139 at the third PCB electrode 214 (PE3), $dx_2$ is the distance between a third centroid of the third PCB electrode (PE3) and a fourth centroid of the fourth PCB electrode (PE4), and $K_b$ is a constant based on the area $A_{PE3}$ of the third PCB electrode 214 (or fourth PCB electrode 216 where the two areas are equal) and permittivity, namely, $K_b = eps0*er*A_{pad3}$, where $eps0$=permittivity of vacuum=8.854 187 8128(13)×10$^{-12}$ Fm$_{-1}$, and er=the relative permittivity of the gaps between the PCB and spring electrodes, such as er=1 for Air.

At 314 and as described further below, the method 300 includes using at least the second local gradient $G_2$ to calculate a third local force at the third PCB electrode 214 (PE3) and a fourth local force at the fourth PCB electrode 216 (PE4). Further and as described in more detail below, at 316 the method 300 includes using at least the first local force, the second local force, the third local force, and the fourth local force to calculate the force F exerted on the touchpad.

In some examples and as described further below, calculating the local forces at each of the PCB electrodes includes calculating expected capacitances at each of these electrodes using a current value of the $d_{01}$ or $d_{02}$ distances between the PCB 134 and the base plate 139, and using the expected capacitances to estimate corrected distances $d_{01C}$ and $d_{02C}$ between the PCB and the base plate. More particularly, with reference now to FIG. 9B, at 318 the method 300 includes calculating a first expected capacitance CaPE1 at the first PCB electrode 210 (PE1) in response to the force F and based at least in part on the first change in capacitance $\Delta C_{H1}$ at the first PCB electrode, $d_{01}$, and $d_{step}$. For example, the first expected capacitance CaPE1 at the first PCB electrode 210 (PE1) can be calculated using the following equation:

$$CaPE1 = eps0 * er * A_{PE1}/(d_{01} - d_{step}) + \Delta C_{H1},$$

where $A_{PE1}$ is the area of the first PCB electrode 210 (PE1), and $d_{step} = d_2 - d_1$.

At 320 the method 300 includes calculating a second expected capacitance CaPE2 at the second PCB electrode in response to the force F and based at least in part on the second change in capacitance $\Delta C_{H2}$ at the second PCB electrode, distance $d_{01}$, and $d_{step}$. For example, the second expected capacitance CaPE2 at the second PCB electrode 212 (PE2) can be calculated using the following equation:

$$CaPE2 = eps0 * er * A_{PE2}/(d_{01} - d_{step}) + \Delta C_{H2},$$

where $A_{PE2}$ is the area of the first PCB electrode 210 (PE2), and $d_{step} = d_2 - d_1$.

At 322 the method 300 includes calculating a third expected capacitance CaPE3 at the third PCB electrode 214 (PE3) in response to the force F and based at least in part on the third change in capacitance $\Delta C_{H3}$ at the third PCB electrode and $d_{o2}$. For example, the third expected capacitance CaPE3 at the third PCB electrode 214 (PE3) can be calculated using the following equation:

$$CaPE3 = eps0 * er * A_{PE3}/d_{o2} + \Delta C_{H3,}$$

where $A_{PE3}$ is the area of the third PCB electrode 214 (PE3).

At 324 the method 300 includes calculating a fourth expected capacitance CaPE4 at the fourth PCB electrode in response to the force F and based at least in part on the fourth change in capacitance $\Delta C_{H4}$ at the fourth PCB electrode and $d_{o2}$. For example, the fourth expected capacitance CaPE4 at the fourth PCB electrode 216 (PE4) can be calculated using the following equation:

$$CaPE4 = eps0 * er * A_{PE4}/d_{o2} + \Delta C_{H4,}$$

where $A_{PE4}$ is the area of the fourth PCB electrode 216 (PE4).

As noted above, these expected capacitances along with the corresponding local gradients can then be utilized to calculate corrected distances between the PCB 134 and the base plate 139. More particularly, at 326 the method 300 includes estimating a first corrected distance $d_{o1C}$ between the PCB 134 and the base plate 139 at the first PCB electrode 210 (PE) based at least in part on the first expected capacitance CaPE1 at the first PCB electrode and first local gradient $G_1$. For example, the first corrected distance $d_{o1C}$ can be calculated using the following equation:

$$d_{o1C} = eps0 * er * A_{PE1}/CaPE1 + G_1 * d_{x1},$$

where $d_{x1}$ is the distance between the first centroid of the first PCB electrode (PE1) and the second centroid of the second PCB electrode (PE2) (see FIG. 8A).

Similarly, at 328 the method 300 includes estimating a second corrected distance $d_{o2C}$ between the PCB 134 and the base plate 139 at the third PCB electrode 214 (PE3) based at least in part on the third expected capacitance CaPE3 at the third PCB electrode and second local gradient $G_2$. For example, the second corrected distance $d_{o2C}$ can be calculated using the following equation:

$$d_{o2C} = eps0 * er * A_{PE3}/CaPE1 + G_1 * d_{x2},$$

where $d_{x2}$ is the distance between the third centroid of the third PCB electrode (PE3) and the fourth centroid of the fourth PCB electrode (PE4) (see FIG. 8B).

Figure 9A:
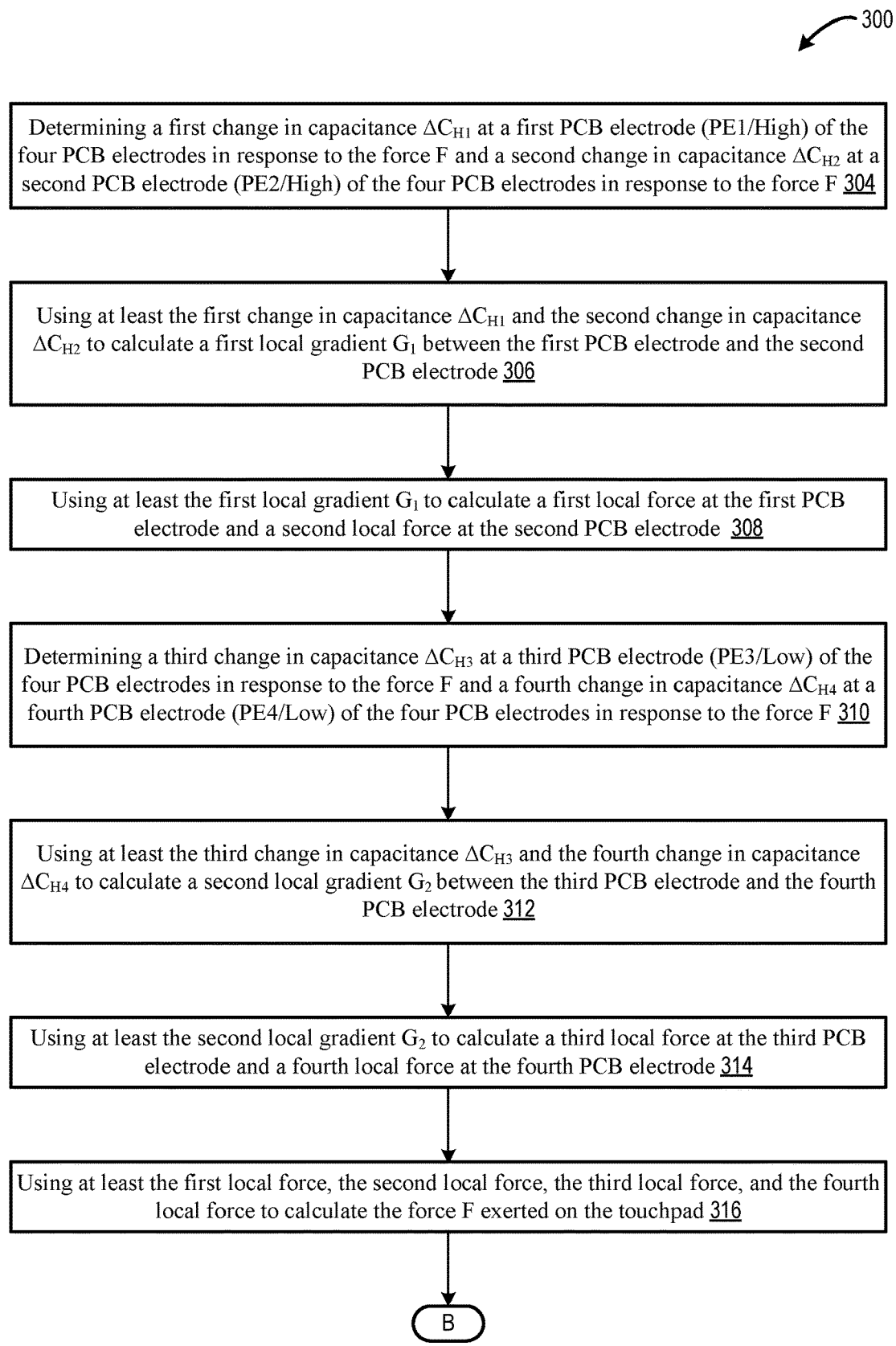
Figure 9C:
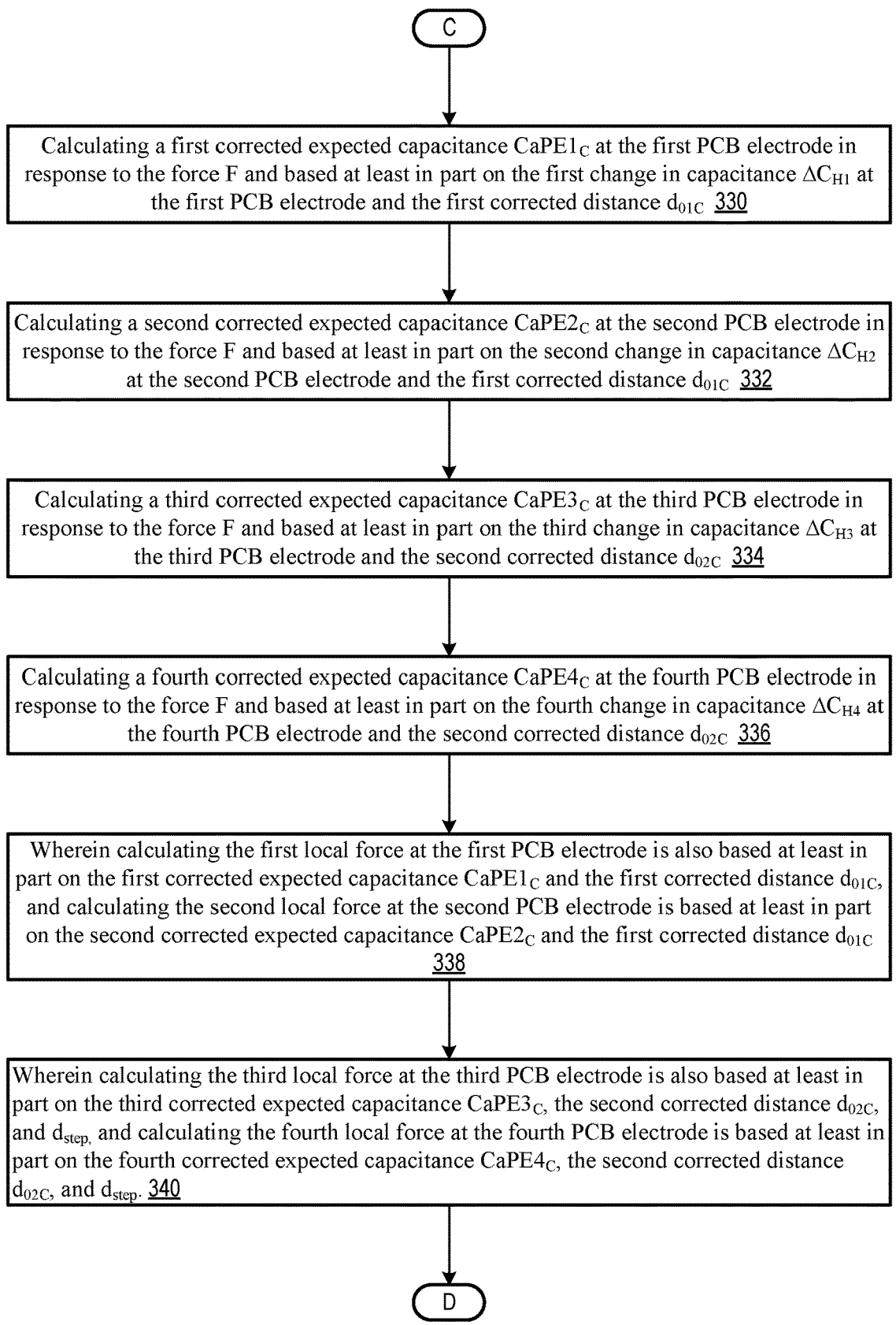

The first corrected distance $d_{o1C}$ and the second corrected distance $d_{o2C}$ can then be utilized to calculate corrected expected capacitances at each of the PCB electrodes. With reference now to FIG. 9C, at 330 the method 300 includes calculating a first corrected expected capacitance $CaPE1_C$ at the first PCB electrode 210 (PE1) in response to the force F and based at least in part on the first change in capacitance $\Delta C_{H1}$ at the first PCB electrode and the first corrected distance $d_{o1C}$. For example, the first corrected expected capacitance $CaPE1_C$ can be calculated using the following equation:

$$CaPE1_C = \left[eps0 * er * A_{PE1}/(d_{o1C})\right] - \left[eps0 * er * A_{PE1}/(d_{o1C} - d_{step}) + \Delta C_{H1}\right],$$

where $A_{PE1}$ is the area of the first PCB electrode 210 (PE1), $d_{step}=d_2-d_1$, and $\Delta C_{H1}$ is the first change in capacitance at the first PCB electrode.

At 332 the method 300 includes calculating a second corrected expected capacitance $CaPE2_C$ at the second PCB electrode 212 (PE2) in response to the force F and based at least in part on the second change in capacitance $\Delta C_{H2}$ at the second PCB electrode and the first corrected distance $d_{o1C}$. For example, the second corrected expected capacitance $CaPE2_C$ can be calculated using the following equation:

$$CaPE2_C = \left[eps0 * er * A_{PE2}/(d_{o1C})\right] - \left[eps0 * er * A_{PE2}/(d_{o1C} - d_{step}) + \Delta C_{H2}\right],$$

where $A_{PE2}$ is the area of the second PCB electrode 212 (PE2), $d_{step}=d_2-d_1$, and $\Delta C_{H2}$ is the second change in capacitance at the second PCB electrode.

At 334 the method 300 includes calculating a third corrected expected capacitance $CaPE3_C$ at the third PCB electrode 214 (PE3) in response to the force F and based at least in part on the third change in capacitance $\Delta C_{H3}$ at the third PCB electrode and the second corrected distance $d_{o2C}$. For example, the third corrected expected capacitance $CaPE3_C$ can be calculated using the following equation:

$$CaPE3_C = \left[eps0 * er * A_{PE3}/(d_{o2C})\right] - \left[eps0 * er * A_{PE3}/(d_{o2C} - d_{step}) + \Delta C_{H3}\right],$$

where $A_{PE3}$ is the area of the third PCB electrode 214 (PE3), $d_{step}=d_2-d_1$, and $\Delta C_{H3}$ is the third change in capacitance at the third PCB electrode.

At 336 the method 300 includes calculating a fourth corrected expected capacitance $CaPE4_C$ at the fourth PCB electrode 216 (PE4) in response to the force F and based at least in part on the fourth change in capacitance $\Delta C_{H4}$ at the fourth PCB electrode and the second corrected distance $d_{o2C}$. For example, the fourth corrected expected capacitance $CaPE4_C$ can be calculated using the following equation:

$$CaPE4_C = \left[eps0 * er * A_{PE4}/(d_{o2C})\right] - \left[eps0 * er * A_{PE4}/(d_{o2C} - d_{step}) + \Delta C_{H4}\right],$$

where $A_{PE4}$ is the area of the fourth PCB electrode 216 (PE4), $d_{step}=d_2-d_1$, and $\Delta C_{H4}$ is the fourth change in capacitance at the fourth PCB electrode.

The corrected capacitances at each of the PCB electrodes can then be utilized to calculate the local forces at each of the PCB electrodes. With continued reference to FIG. 9C, at 338 the method 300 includes calculating the first local force $F_1$ at the first PCB electrode 210 (PE1) based at least in part on the first corrected expected capacitance $CaPE1_C$ and the first corrected distance $d_{O1C}$, and calculating the second local force $F_2$ at the second PCB electrode 212 (PE2) based at least in part on the second corrected expected capacitance $CaPE2_C$ and the first corrected distance $d_{O1C}$. For example, the first local force $F_1$ at the first PCB electrode 210 (PE1) can be calculated using the following equation:

$$F_1 = K1 \left( \frac{d_{O1C}^2}{\varepsilon \frac{A_{PE1}}{\Delta CH1} + d_{O1C}} \right)$$

where $A_{PE1}$ is the area of the first PCB electrode 210 (PE1), $\Delta C_{H1}$ is the first change in capacitance at the first PCB electrode, and $K1 = eps0*er*A_{PE1}$.

Similarly at the second PCB electrode 212 (PE2), the second local force $F_2$ can be calculated using the following equation:

$$F_2 = K2 \left( \frac{d_{O1C}^2}{\varepsilon \frac{A_{PE2}}{\Delta CH2} + d_{O1C}} \right)$$

where $A_{PE2}$ is the area of the second PCB electrode 212 (PE2), $\Delta C_{H2}$ is the second change in capacitance at the second PCB electrode, and $K_2 = eps0*er*A_{PE2}$.

With continued reference to FIG. 9C, at 340 the method 300 includes calculating the third local force $F_3$ at the third PCB electrode 214 (PE3) based at least in part on the third corrected expected capacitance $CaPE3_C$, the second corrected distance $d_{O2C}$, and $d_{step}$, and calculating the fourth local force F4 at the fourth PCB electrode 216 (PE4) is based at least in part on the fourth corrected expected capacitance $CaPE4_C$, the second corrected distance $d_{O2C}$, and $d_{step}$. For example, the third local force $F_1$ at the first PCB electrode 210 (PE1) can be calculated using the following equation:

$$F_3 = K3 \left( \frac{(d_{O2C} + d_{step})^2}{\varepsilon \frac{A_{PE3}}{\Delta CH3} + d_0 + d_{step}} \right)$$

where $A_{PE3}$ is the area of the third PCB electrode 214 (PE3), $\Delta C_{H3}$ is the third change in capacitance at the third PCB electrode, and $K3 = eps0*er*A_{PE3}$.

Similarly at the fourth PCB electrode 216 (PE4), the fourth local force $F_4$ can be calculated using the following equation:

$$F_4 = K4 \left( \frac{(d_{O2C} + d_{step})^2}{\varepsilon \frac{A_{PE4}}{\Delta CH4} + d_0 + d_{step}} \right)$$

where $A_{PE4}$ is the area of the fourth PCB electrode 216 (PE4), and $\Delta C_{H4}$ is the fourth change in capacitance at the fourth PCB electrode.

Advantageously, by utilizing the corrected capacitances at each of the PCB electrodes along with the corrected distances between the PCB 134 and the base plate 139 to calculate the local forces at each of the PCB electrodes, potential errors resulting from bending of the PCB and/or other components can be reduced. Accordingly, in one potential advantage of the present disclosure, more accurate touch force calculations can be generated.

In some examples, the four local forces $F_1$-$F_4$ at the four PCB electrodes can be averaged to calculate the force F exerted on the touchpad 120. In other examples, the location of the force F on the touchpad 120 can be utilized to weight the four local forces $F_1$-$F_4$ and generate a weighted average. In the current example in which four sets of springs 138 are utilized in different locations on the base plate 139, the local forces calculated at each spring electrode of the different springs 138 can be utilized to estimate the force F exerted on the touchpad 120.

With reference now to FIG. 9D and as noted above, at 342 the method 300 also includes wherein the first spring electrode 176 and the second spring electrode 178 each comprise centroids 182 and 184, respectively, aligned on a first axis, and the third spring electrode 183 and the fourth spring electrode 186 each comprise centroids 190 and 192, respectively, aligned on a second axis perpendicular to the first axis. At 344 the method 300 includes wherein the spring 138 is mounted on the base plate 139 that defines an aperture 146, and the spring overlies the aperture and comprises a first beam 160 extending from a first internal wall 162 to a second side 164 of a central portion 140 that overlies the aperture, and a second beam 168 extending from a second internal wall 170 that is opposite to the first internal wall to a first side 172 of the central portion 140 that is opposite to the second side.

At 346 the method 300 includes wherein the first spring electrode 176, second spring electrode 178, third spring electrode 183, and fourth spring electrode 186 are integral portions of the spring 138. At 348 the method 300 includes wherein the first spring electrode, second spring electrode, third spring electrode, and fourth spring electrode are separate components affixed to the spring.

Figure 10:
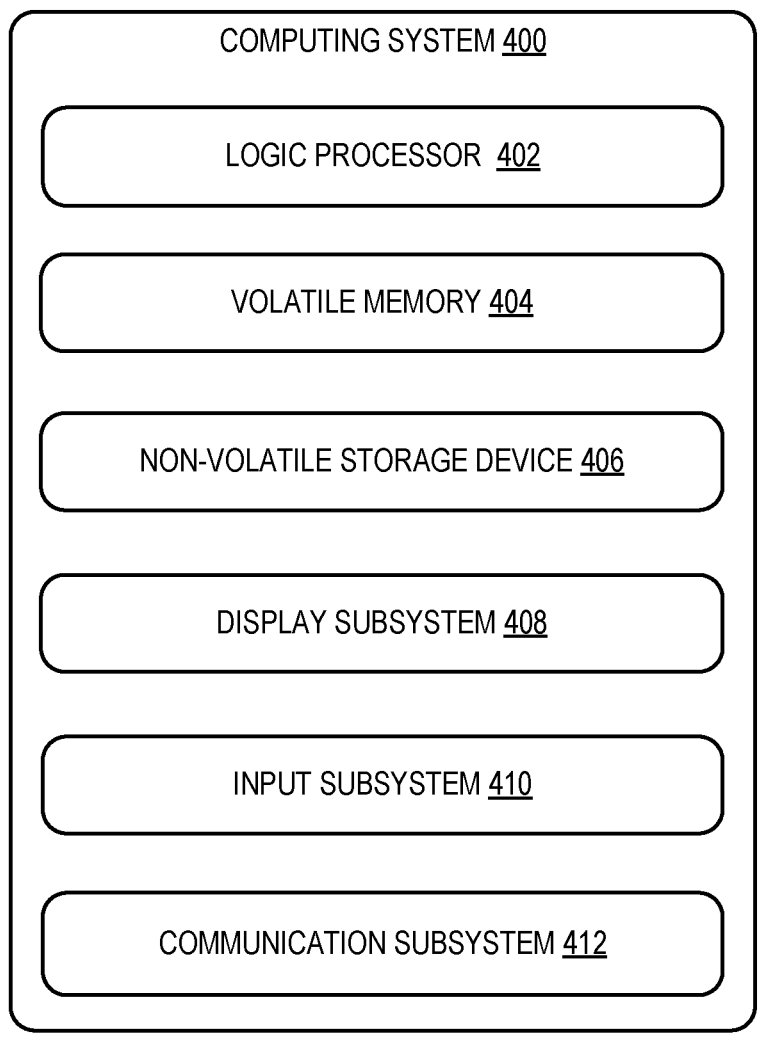
FIG. 10 shows a block diagram of an example computing system according to examples of the present disclosure.

In some embodiments, the touchpads and components described herein may be utilized with a computing system of one or more computing devices. Similarly, the methods and processes described herein may be implemented as a computer-application program or service, an application-programming interface (API), a library, and/or other computer-program product. FIG. 10 schematically shows a non-limiting embodiment of a computing system 400 configured to provide any to all of the compute functionality described herein. Computing system 400 is shown in simplified form.

The laptop computing device 100 described above may comprise computing system 400 or one or more aspects of computing system 400. Computing system 400 may take the form of one or more laptops, personal computers, server computers, tablet computers, home-entertainment computers, gaming devices, mobile computing devices, mobile communication devices (e.g., smart phone), wearable computing devices, and/or other computing devices.

Computing system 400 includes a logic processor 402, volatile memory 404, and a non-volatile storage device 406. Computing system 400 may optionally include a display subsystem 408, input subsystem 410, communication subsystem 412, and/or other components not shown in FIG. 24.

Logic processor 402 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 404 may include physical devices that include random access memory (RAM). Volatile memory 404 is typically utilized by logic processor 402 to temporarily store information during processing of software instructions. It will be appreciated that volatile memory 404 typically does not continue to store instructions when power is cut to the volatile memory 404.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), magnetic memory (e.g., hard-disk drive, floppy-disk drive, tape drive, MRAM, etc.), and/or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Aspects of logic processor 402, volatile memory 404, and non-volatile storage device 406 may be integrated together into one or more hardware-logic components. Such hardware-logic components may include field-programmable gate arrays (FPGAs), program-and application-specific integrated circuits (PASIC/ASICs), program- and application-specific standard products (PSSP/ASSPs), system-on-a-chip (SOC), and complex programmable logic devices (CPLDs), for example.

When included, display subsystem 408 may be used to present a visual representation of data held by non-volatile storage device 406. As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

Input subsystem 410 may comprise or interface with one or more user-input devices such as touchpad 120, keyboard 124, touch screen display 104, a mouse, electronic pen, stylus, or game controller. In some embodiments, the input subsystem may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local-or wide-area network, such as an HDMI over Wi-Fi connection. In some embodiments, the communication subsystem may allow computing system 400 to send and/or receive messages to and/or from other devices via a network such as the Internet.

The following paragraphs provide additional support for the claims of the subject application. One aspect provides a method for estimating a force F exerted on a touchpad in a computing device, the touchpad comprising a printed circuit board (PCB) comprising four PCB electrodes and a spring spaced from the PCB and comprising four spring electrodes, the spring mounted on a base plate, the method comprising: determining a first change in capacitance $\Delta C_{H1}$ at a first PCB electrode of the four PCB electrodes in response to the force F and a second change in capacitance $\Delta C_{H2}$ at a second PCB electrode of the four PCB electrodes in response to the force F; using at least the first change in capacitance $\Delta C_{H1}$ and the second change in capacitance $\Delta C_{H2}$ to calculate a first local gradient $G_1$ between the first PCB electrode and the second PCB electrode; using at least the first local gradient $G_1$ to calculate a first local force $F_1$ at the first PCB electrode and a second local force $F_2$ at the second PCB electrode; determining a third change in capacitance $\Delta C_{H3}$ at a third PCB electrode of the four PCB electrodes in response to the force F and a fourth change in capacitance $\Delta C_{H4}$ at a fourth PCB electrode of the four PCB electrodes in response to the force F;

using at least the third change in capacitance $\Delta C_{H3}$ and the fourth change in capacitance $\Delta C_{H4}$ to calculate a second local gradient $G_2$ between the third PCB electrode and the fourth PCB electrode; using at least the second local gradient $G_2$ to calculate a third local force $F_3$ at the third PCB electrode and a fourth local force $F_4$ at the fourth PCB electrode; and using at least the first local force $F_1$, the second local force $F_2$, the third local force $F_3$, and the fourth local force $F_4$ to calculate the force F exerted on the touchpad. The method may additionally or alternatively include, wherein a first current distance between the PCB and the base plate at the first PCB electrode is $d_{01}$, the first PCB electrode is spaced from a first spring electrode of the four spring electrodes by a first distance $d_1$, the second PCB electrode is spaced from a second spring electrode of the four spring electrodes by approximately the first distance $d_1$, a second current distance between the PCB and the base plate at the third PCB electrode is $d_{02}$, the third PCB electrode is spaced from a third spring electrode of the four spring electrodes by a second distance $d_2$ that is greater than $d_1$, and the fourth PCB electrode is spaced from a fourth spring electrode of the four spring electrodes by approximately the second distance $d_2$, wherein $d_2-d_1=d_{step}$, the method further comprising: calculating a first expected capacitance CaPE1 at the first PCB electrode in response to the force F and based at least in part on the first change in capacitance $\Delta C_{H1}$ at the first PCB electrode, $d_{01}$, and $d_{step}$; calculating a second expected capacitance CaPE2 at the second PCB electrode in response to the force F and based at least in part on the second change in capacitance $\Delta C_{H2}$ at the second PCB electrode, $d_{01}$, and $d_{step}$; calculating a third expected capacitance CaPE3 at the third PCB electrode in response to the force F and based at least in part on the third change in capacitance $\Delta C_{H3}$ at the third PCB electrode and $d_{02}$; and calculating a fourth expected capacitance CaPE4 at the fourth PCB electrode in response to the force F and based at least in part on the fourth change in capacitance $\Delta C_{H4}$ at the fourth PCB electrode and $d_{02}$. The method may additionally or alternatively include estimating a first corrected distance $d_{01C}$ between the PCB and the base plate at the first PCB electrode based at least in part on the first expected capacitance CaPE1 at the first PCB electrode and the first local gradient $G_1$; and estimating a second corrected distance $d_{02C}$ between the PCB and the base plate at the third PCB electrode based at least in part on the third expected capacitance CaPE3 at the third PCB electrode and the second local gradient $G_2$. The method may additionally or alternatively include calculating a first corrected expected capacitance CaPE1$_C$ at the first PCB electrode in response to the force F and based at least in part on the first change in capacitance $\Delta C_{H1}$ at the first PCB electrode and the first corrected distance $d_{01C}$; calculating a second corrected expected capacitance CaPE2$_C$ at the second PCB electrode in response to the force F and based at least in part on the second change in capacitance $\Delta C_{H2}$ at the second PCB electrode and the first corrected distance $d_{01C}$; calculating a third corrected expected capacitance CaPE3$_C$ at the third PCB electrode in response to the force F and based at least in part on the third change in capacitance $\Delta C_{H3}$ at the third PCB electrode and the second corrected distance $d_{02C}$; and calculating a fourth corrected expected capacitance CaPE4$_C$ at the fourth PCB electrode in response to the force F and based at least in part on the fourth change in capacitance $\Delta C_{H4}$ at the fourth PCB electrode and the second corrected distance $d_{02C}$. The method may additionally or alternatively include, wherein calculating the first local force at the first PCB electrode is also based at least in part on the first corrected expected capacitance CaPE1$_C$ and the first corrected distance $d_{01C}$, and calculating the second local force at the second PCB electrode is based at least in part on the second corrected expected capacitance CaPE2$_C$ and the first corrected distance $d_{01C}$. The method may additionally or alternatively include, wherein calculating the third local force at the third PCB electrode is also based at least in part on the third corrected expected capacitance CaPE3$_C$, the second corrected distance $d_{02C}$, and $d_{step}$; and calculating the fourth local force at the fourth PCB electrode is based at least in part on the fourth corrected expected capacitance CaPE4$_C$, the second corrected distance $d_{02C}$, and $d_{step}$. The method may additionally or alternatively include, wherein the first spring electrode and the second spring electrode each comprise centroids aligned on a first axis, and the third spring electrode and the fourth spring electrode each comprise centroids aligned on a second axis perpendicular to the first axis. The method may additionally or alternatively include, wherein the base plate defines an aperture, and the spring overlies the aperture and comprises: a first beam extending from a first internal wall to a second side of a central portion that overlies the aperture; and a second beam extending from a second internal wall that is opposite to the first internal wall to a first side of the central portion that is opposite to the second side. The method may additionally or alternatively include, wherein the first spring electrode, second spring electrode, third spring electrode, and fourth spring electrode are integral portions of the spring. The method may additionally or alternatively include, wherein the first spring electrode, second spring electrode, third spring electrode, and fourth spring electrode are separate components affixed to the spring.

Another aspect provides computing device, comprising: a force sensing touchpad comprising: a printed circuit board (PCB) comprising four PCB electrodes; a base plate spaced from the PCB and defining an aperture; and a spring mounted on the base plate and overlying the aperture, the spring comprising four spring electrodes, wherein each of the four PCB electrodes is spaced from and overlies one of the four spring electrodes of the spring; a processor; and a memory storing instructions executable by the processor to: determine a first change in capacitance $\Delta C_{H1}$ at a first PCB electrode of the four PCB electrodes in response to the force F and a second change in capacitance $\Delta C_{H2}$ at a second PCB electrode of the four PCB electrodes in response to the force F; use at least the first change in capacitance $\Delta C_{H1}$ and the second change in capacitance $\Delta C_{H2}$ to calculate a first local gradient $G_1$ between the first PCB electrode and the second PCB electrode; use at least the first local gradient $G_1$ to calculate a first local force at the first PCB electrode and a second local force at the second PCB electrode; determine a third change in capacitance $\Delta C_{H3}$ at a third PCB electrode of the four PCB electrodes in response to the force F and a fourth change in capacitance $\Delta C_{H4}$ at a fourth PCB electrode of the four PCB electrodes in response to the force F; use at least the third change in capacitance $\Delta C_{H3}$ and the fourth change in capacitance $\Delta C_{H4}$ to calculate a second local gradient $G_2$ between the third PCB electrode and the fourth PCB electrode; use at least the second local gradient $G_2$ to calculate a third local force at the third PCB electrode and a fourth local force at the fourth PCB electrode; use at least the first local force, the second local force, the third local force, and the fourth local force to calculate a force F exerted on the touchpad. The computing device may additionally or alternatively include, wherein a first current distance between the PCB and the base plate at the first PCB electrode is $d_{01}$, the first PCB electrode is spaced from a first spring electrode of the four spring electrodes by a first distance $d_1$, the second PCB electrode is spaced from a second spring electrode of the four spring electrodes by approximately the first distance $d_1$, a second current distance between the PCB and the base plate at the third PCB electrode is $d_{02}$, the third PCB electrode is spaced from a third spring electrode of the four spring electrodes by a second distance $d_2$ that is greater than $d_1$, and the fourth PCB electrode is spaced from a fourth spring electrode of the four spring electrodes by approximately the second distance $d_2$, wherein $d_2-d_1=d_{step}$, wherein the instructions are executable to: calculate a first expected capacitance CaPE1 at the first PCB electrode in response to the force F and based at least in part on the first change in capacitance $\Delta C_{H1}$ at the first PCB electrode, $d_{01}$, and $d_{step}$; calculate a second expected capacitance CaPE2 at the second PCB electrode in response to the force F and based at least in part on the second change in capacitance $\Delta C_{H2}$ at the second PCB electrode, $d_{01}$, and $d_{step}$; calculate a third expected capacitance CaPE3 at the third PCB electrode in response to the force F and based at least in part on the third change in capacitance $\Delta C_{H3}$ at the third PCB electrode and $d_{02}$; and calculate a fourth expected capacitance CaPE4 at the fourth PCB electrode in response to the force F and based at least in part on the fourth change in capacitance $\Delta C_{H4}$ at the fourth PCB electrode and $d_{02}$. The computing device may additionally or alternatively include, wherein the instructions are executable to: estimate a first corrected distance $d_{01C}$ between the PCB and the base plate at the first PCB electrode based at least in part on the first expected capacitance CaPE1 at the first PCB electrode and first local gradient $G_1$; and estimate a second corrected distance $d_{02C}$ between the PCB and the base plate at the third PCB electrode based at least in part on the third expected capacitance CaPE3 at the third PCB electrode and second local gradient $G_2$. The computing device may additionally or alternatively include, wherein the instructions are executable to: calculate a first corrected expected capacitance CaPE1$_C$ at the first PCB electrode in response to the force F and based at least in part on the first change in capacitance $\Delta C_{H1}$ at the first PCB electrode and the first corrected distance $d_{01C}$; calculate a second corrected expected capacitance CaPE2$_C$ at the second PCB electrode in response to the force F and based at least in part on the second change in capacitance $\Delta C_{H2}$ at the second PCB electrode and the first corrected distance $d_{01C}$; calculate a third corrected expected capacitance CaPE3$_C$ at the third PCB electrode in response to the force F and based at least in part on the third change in capacitance $\Delta C_{H3}$ at the third PCB electrode and the second corrected distance $d_{02C}$; and calculate a fourth corrected expected capacitance CaPE4$_C$ at the fourth PCB electrode in response to the force F and based at least in part on the fourth change in capacitance $\Delta C_{H4}$ at the fourth PCB electrode and the second corrected distance $d_{02C}$. The computing device may additionally or alternatively include, wherein the instructions are executable to: calculate the first local force at the first PCB electrode based at least in part on the first corrected expected capacitance CaPE1$_C$ and the first corrected distance $d_{01C}$; and calculate the second local force at the second PCB electrode based at least in part on the second corrected expected capacitance CaPE2$_C$ and the first corrected distance $d_{01C}$. The computing device may additionally or alternatively include, wherein the instructions are executable to: calculate the third local force at the third PCB electrode based at least in part on the third corrected expected capacitance CaPE3$_C$, the second corrected distance $d_{02C}$, and $d_{step}$; and calculate a fourth local force $F_1$ at the fourth PCB electrode based at least in part on the fourth corrected expected capacitance CaPE4$_C$. the second corrected distance $d_{02C}$, and $d_{step}$. The computing device may additionally or alternatively include, wherein the first spring electrode and the second spring electrode each comprise centroids aligned on a first axis, and the third spring electrode and the fourth spring electrode each comprise centroids aligned on a second axis perpendicular to the first axis. The computing device may additionally or alternatively include, wherein the spring comprises: a first beam extending from a first internal wall to a second side of a central portion that overlies the aperture defined in the base plate; and a second beam extending from a second internal wall that is opposite to the first internal wall to a first side of the central portion that is opposite to the second side. The computing device may additionally or alternatively include, wherein the first spring electrode PE1, second spring electrode PE2, third spring electrode PE3, and fourth spring electrode PE4 are integral portions of the spring.

Another aspect provides a computing device, comprising: a force sensing touchpad comprising: a printed circuit board (PCB) comprising four PCB electrodes; a base plate spaced from the PCB and defining an aperture; and a spring mounted on the base plate and overlying the aperture, the spring comprising four spring electrodes, wherein each of the four PCB electrodes is spaced from and overlies one of the four spring electrodes of the spring; a processor; and a memory storing instructions executable by the processor to: determine a first change in capacitance $\Delta C_{H1}$ at a first PCB electrode of the four PCB electrodes in response to the force F and a second change in capacitance $\Delta C_{H2}$ at a second PCB electrode of the four PCB electrodes in response to the force F; use at least the first change in capacitance $\Delta C_{H1}$ and the second change in capacitance $\Delta C_{H2}$ to calculate a first local gradient $G_1$ between the first PCB electrode and the second PCB electrode; use at least the first local gradient $G_1$ to calculate a first local force at the first PCB electrode and a second local force at the second PCB electrode; determine a third change in capacitance $\Delta C_{H3}$ at a third PCB electrode of the four PCB electrodes in response to the force F and a fourth change in capacitance $\Delta C_{H4}$ at a fourth PCB electrode of the four PCB electrodes in response to the force F; use at least the third change in capacitance $\Delta C_{H3}$ and the fourth change in capacitance $\Delta C_{H4}$ to calculate a second local gradient $G_2$ between the third PCB electrode and the fourth PCB electrode; use at least the second local gradient $G_2$ to calculate a third local force at the third PCB electrode and a fourth local force at the fourth PCB electrode; use at least the first local force, the second local force, the third local force, and the fourth local force to calculate a force F exerted on the touchpad, wherein a first current distance between the PCB and the base plate at the first PCB electrode is $d_{01}$, the first PCB electrode is spaced from a first spring electrode of the four spring electrodes by a first distance $d_1$, the second PCB electrode is spaced from a second spring electrode of the four spring electrodes by approximately the first distance $d_1$, a second current distance between the PCB and the base plate at the third PCB electrode is $d_{02}$, the third PCB electrode is spaced from a third spring electrode of the four spring electrodes by a second distance $d_2$ that is greater than $d_1$, and the fourth PCB electrode is spaced from a fourth spring electrode of the four spring electrodes by approximately the second distance $d_2$, and wherein the first spring electrode, second spring electrode, third spring electrode, and fourth spring electrode are integral portions of the spring.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for estimating a force F exerted on a touchpad in a computing device, the touchpad comprising a printed circuit board (PCB) comprising four PCB electrodes and a spring spaced from the PCB and comprising four spring electrodes, the spring mounted on a base plate, wherein a first current distance between the PCB and the base plate at a first PCB electrode of the four PCB electrodes is $d_{01}$, the first PCB electrode is spaced from a first spring electrode of the four spring electrodes by a first distance $d_1$, a second PCB electrode of the four PCB electrodes is spaced from a second spring electrode of the four spring electrodes by approximately the first distance $d_1$, a second current distance between the PCB and the base plate at a third PCB electrode of the four PCB electrodes is $d_{02}$, the third PCB electrode is spaced from a third spring electrode of the four spring electrodes by a second distance $d_2$ that is greater than $d_1$, and a fourth PCB electrode of the four PCB electrodes is spaced from a fourth spring electrode of the four spring electrodes by approximately the second distance $d_2$, the method comprising:
- determining a first change in capacitance $\Delta AC_{H1}$ at the first PCB electrode of the four PCB electrodes in response to the force F and a second change in capacitance $\Delta C_{H2}$ at the second PCB electrode of the four PCB electrodes in response to the force F;
- using at least the first change in capacitance $\Delta C_{H1}$ and the second change in capacitance $\Delta C_{H2}$ to calculate a first local gradient $G_1$ between the first PCB electrode and the second PCB electrode;
- using at least the first local gradient $G_1$ to calculate a first local force $F_1$ at the first PCB electrode and a second local force $F_2$ at the second PCB electrode;
- determining a third change in capacitance $\Delta C_{H3}$ at the third PCB electrode of the four PCB electrodes in response to the force F and a fourth change in capacitance $\Delta C_{H4}$ at the fourth PCB electrode of the four PCB electrodes in response to the force F;
- using at least the third change in capacitance $\Delta C_{H3}$ and the fourth change in capacitance $\Delta C_{H4}$ to calculate a second local gradient $G_2$ between the third PCB electrode and the fourth PCB electrode;
- using at least the second local gradient $G_2$ to calculate a third local force $F_3$ at the third PCB electrode and a fourth local force $F_4$ at the fourth PCB electrode; and
- using at least the first local force $F_1$, the second local force $F_2$, the third local force $F_3$, and the fourth local force $F_4$ to calculate the force F exerted on the touchpad.

2. The method of claim 1,
wherein $d_2-d_1=d_{step}$, the method further comprising:
- calculating a first expected capacitance CaPE1 at the first PCB electrode in response to the force F and based at least in part on the first change in capacitance $\Delta C_{H1}$ at the first PCB electrode, $d_{01}$, and $d_{step}$;
- calculating a second expected capacitance CaPE2 at the second PCB electrode in response to the force F and based at least in part on the second change in capacitance $\Delta C_{H2}$ at the second PCB electrode, $d_{01}$, and $d_{step}$;
- calculating a third expected capacitance CaPE3 at the third PCB electrode in response to the force F and based at least in part on the third change in capacitance $\Delta C_{H3}$ at the third PCB electrode and $d_{02}$; and
- calculating a fourth expected capacitance CaPE4 at the fourth PCB electrode in response to the force F and based at least in part on the fourth change in capacitance $\Delta C_{H4}$ at the fourth PCB electrode and $d_{02}$.

3. The method of claim 2, further comprising:
- estimating a first corrected distance $d_{01C}$ between the PCB and the base plate at the first PCB electrode based at least in part on the first expected capacitance CaPE1 at the first PCB electrode and the first local gradient $G_1$; and
- estimating a second corrected distance $d_{02c}$ between the PCB and the base plate at the third PCB electrode based at least in part on the third expected capacitance CaPE3 at the third PCB electrode and the second local gradient $G_2$.

4. The method of claim 3, further comprising:
- calculating a first corrected expected capacitance $CaPE1_C$ at the first PCB electrode in response to the force F and based at least in part on the first change in capacitance $\Delta C_{H1}$ at the first PCB electrode and the first corrected distance $d_{01C}$;
- calculating a second corrected expected capacitance $CaPE_C$ at the second PCB electrode in response to the force F and based at least in part on the second change in capacitance $\Delta C_{H2}$ at the second PCB electrode and the first corrected distance $d_{01C}$;
- calculating a third corrected expected capacitance $CaPE3_C$ at the third PCB electrode in response to the force F and based at least in part on the third change in capacitance $\Delta C_{H3}$ at the third PCB electrode and the second corrected distance $d_{02C}$; and
- calculating a fourth corrected expected capacitance $CaPE4_C$ at the fourth PCB electrode in response to the force F and based at least in part on the fourth change in capacitance $\Delta C_{H4}$ at the fourth PCB electrode and the second corrected distance $d_{02c}$.

5. The method of claim 4, wherein calculating the first local force at the first PCB electrode is also based at least in part on the first corrected expected capacitance $CaPE1_C$ and the first corrected distance $d_{01C}$, and calculating the second local force at the second PCB electrode is based at least in part on the second corrected expected capacitance $CaPE2_C$ and the first corrected distance $d_{01c}$.

6. The method of claim 5, wherein calculating the third local force at the third PCB electrode is also based at least in part on the third corrected expected capacitance CaPE3C, the second corrected distance $d_{02C}$, and $d_{step}$; and
- calculating the fourth local force at the fourth PCB electrode is based at least in part on the fourth corrected expected capacitance $CaPE4_C$, the second corrected distance $d_{02C}$, and $d_{step}$.

7. The method of claim 2, wherein the first spring electrode and the second spring electrode each comprise centroids aligned on a first axis, and the third spring electrode and the fourth spring electrode each comprise centroids aligned on a second axis perpendicular to the first axis.

8. The method of claim 7, wherein the base plate defines an aperture, and the spring overlies the aperture and comprises:
- a first beam extending from a first internal wall to a second side of a central portion that overlies the aperture; and
- a second beam extending from a second internal wall that is opposite to the first internal wall to a first side of the central portion that is opposite to the second side.

9. The method of claim 8, wherein the first spring electrode, second spring electrode, third spring electrode, and fourth spring electrode are integral portions of the spring.

10. The method of claim 8, wherein the first spring electrode, second spring electrode, third spring electrode, and fourth spring electrode are separate components affixed to the spring.

11. A computing device, comprising:
a force sensing touchpad comprising:
a printed circuit board (PCB) comprising four PCB electrodes;
a base plate spaced from the PCB and defining an aperture; and
a spring mounted on the base plate and overlying the aperture, the spring comprising four spring electrodes, wherein each of the four PCB electrodes is spaced from and overlies one of the four spring electrodes of the spring, wherein a first current distance between the PCB and the base plate at a first PCB electrode of the four PCB electrodes is $d_{o1}$, the first PCB electrode is spaced from a first spring electrode of the four spring electrodes by a first distance $d_1$, a second PCB electrode of the four PCB electrodes is spaced from a second spring electrode of the four spring electrodes by approximately the first distance $d_1$, a second current distance between the PCB and the base plate at a third PCB electrode of the four PCB electrodes is $d_{o2}$, the third PCB electrode is spaced from a third spring electrode of the four spring electrodes by a second distance $d_2$ that is greater than $d_1$, and a fourth PCB electrode of the four PCB electrodes is spaced from a fourth spring electrode of the four spring electrodes by approximately the second distance $d_2$;
a processor; and
a memory storing instructions executable by the processor to:
determine a first change in capacitance $\Delta C_{H1}$ at the first PCB electrode of the four PCB electrodes in response to the force F and a second change in capacitance $\Delta C_{H2}$ at the second PCB electrode of the four PCB electrodes in response to the force F;
use at least the first change in capacitance $\Delta C_{H1}$ and the second change in capacitance $\Delta C_{H2}$ to calculate a first local gradient $G_1$ between the first PCB electrode and the second PCB electrode;
use at least the first local gradient $G_1$ to calculate a first local force at the first PCB electrode and a second local force at the second PCB electrode;
determine a third change in capacitance $\Delta C_{H3}$ at the third PCB electrode of the four PCB electrodes in response to the force F and a fourth change in capacitance $\Delta C_{H4}$ at the fourth PCB electrode of the four PCB electrodes in response to the force F;
use at least the third change in capacitance $\Delta C_{H3}$ and the fourth change in capacitance $\Delta C_{H4}$ to calculate a second local gradient $G_2$ between the third PCB electrode and the fourth PCB electrode;
use at least the second local gradient $G_2$ to calculate a third local force at the third PCB electrode and a fourth local force at the fourth PCB electrode;
use at least the first local force, the second local force, the third local force, and the fourth local force to calculate a force F exerted on the touchpad.

12. The computing device of claim 11, wherein $d_2-d_1=d_{step}$, wherein the instructions are executable to:
calculate a first expected capacitance CaPE1 at the first PCB electrode in response to the force F and based at least in part on the first change in capacitance $\Delta C_{H1}$ at the first PCB electrode, $d_{o1}$, and $d_{step}$;
calculate a second expected capacitance CaPE2 at the second PCB electrode in response to the force F and based at least in part on the second change in capacitance $\Delta C_{H2}$ at the second PCB electrode, $d_{o1}$, and $d_{step}$;

calculate a third expected capacitance CaPE3 at the third PCB electrode in response to the force F and based at least in part on the third change in capacitance $\Delta C_{H3}$ at the third PCB electrode and $d_{o2}$; and
calculate a fourth expected capacitance CaPE4 at the fourth PCB electrode in response to the force F and based at least in part on the fourth change in capacitance $\Delta C_{H4}$ at the fourth PCB electrode and $d_{o2}$.

13. The computing device of claim 12, wherein the instructions are executable to:
estimate a first corrected distance $d_{o1C}$ between the PCB and the base plate at the first PCB electrode based at least in part on the first expected capacitance CaPE1 at the first PCB electrode and first local gradient $G_1$; and
estimate a second corrected distance $d_{o2C}$ between the PCB and the base plate at the third PCB electrode based at least in part on the third expected capacitance CaPE3 at the third PCB electrode and second local gradient $G_2$.

14. The computing device of claim 13, wherein the instructions are executable to:
calculate a first corrected expected capacitance CaPE1$_C$ at the first PCB electrode in response to the force F and based at least in part on the first change in capacitance $\Delta C_{H1}$ at the first PCB electrode and the first corrected distance $d_{o1C}$;
calculate a second corrected expected capacitance CaPE2$_C$ at the second PCB electrode in response to the force F and based at least in part on the second change in capacitance $\Delta C_{H2}$ at the second PCB electrode and the first corrected distance $d_{o1C}$;
calculate a third corrected expected capacitance CaPE3$_C$ at the third PCB electrode in response to the force F and based at least in part on the third change in capacitance $\Delta C_{H3}$ at the third PCB electrode and the second corrected distance $d_{o2C}$; and
calculate a fourth corrected expected capacitance CaPE4$_C$ at the fourth PCB electrode in response to the force F and based at least in part on the fourth change in capacitance $\Delta C_{H4}$ at the fourth PCB electrode and the second corrected distance $d_{o2C}$.

15. The computing device of claim 14, wherein the instructions are executable to:
calculate the first local force at the first PCB electrode based at least in part on the first corrected expected capacitance CaPE1$_C$ and the first corrected distance $d_{o1C}$; and
calculate the second local force at the second PCB electrode based at least in part on the second corrected expected capacitance CaPE2$_C$ and the first corrected distance $d_{o1C}$.

16. The computing device of claim 15, wherein the instructions are executable to:
calculate the third local force at the third PCB electrode based at least in part on the third corrected expected capacitance CaPE3$_C$, the second corrected distance $d_{o2C}$, and $d_{step}$; and
calculate a fourth local force $F_1$ at the fourth PCB electrode based at least in part on the fourth corrected expected capacitance CaPE4$_C$, the second corrected distance $d_{o2C}$, and $d_{step}$.

17. The computing device of 12, wherein the first spring electrode and the second spring electrode each comprise centroids aligned on a first axis, and the third spring electrode and the fourth spring electrode each comprise centroids aligned on a second axis perpendicular to the first axis.

18. The computing device of 17, wherein the spring comprises:
a first beam extending from a first internal wall to a second side of a central portion that overlies the aperture defined in the base plate; and
a second beam extending from a second internal wall that is opposite to the first internal wall to a first side of the central portion that is opposite to the second side.

19. The computing device of 18, wherein the first spring electrode, second spring electrode, third spring electrode, and fourth spring electrode are integral portions of the spring.

20. A computing device, comprising:
a force sensing touchpad comprising:
a printed circuit board (PCB) comprising four PCB electrodes;
a base plate spaced from the PCB and defining an aperture; and
a spring mounted on the base plate and overlying the aperture, the spring comprising four spring electrodes, wherein each of the four PCB electrodes is spaced from and overlies one of the four spring electrodes of the spring;
a processor; and
a memory storing instructions executable by the processor to:
determine a first change in capacitance $\Delta C_{H1}$ at a first PCB electrode of the four PCB electrodes in response to the force F and a second change in capacitance $\Delta C_{H2}$ at a second PCB electrode of the four PCB electrodes in response to the force F;
use at least the first change in capacitance $\Delta C_{H1}$ and the second change in capacitance $\Delta C_{H2}$ to calculate a first local gradient $G_1$ between the first PCB electrode and the second PCB electrode;
use at least the first local gradient $G_1$ to calculate a first local force at the first PCB electrode and a second local force at the second PCB electrode;
determine a third change in capacitance $\Delta C_{H3}$ at a third PCB electrode of the four PCB electrodes in response to the force F and a fourth change in capacitance $\Delta C_{H4}$ at a fourth PCB electrode of the four PCB electrodes in response to the force F;
use at least the third change in capacitance $\Delta C_{H3}$ and the fourth change in capacitance $\Delta C_{H4}$ to calculate a second local gradient $G_2$ between the third PCB electrode and the fourth PCB electrode;
use at least the second local gradient $G_2$ to calculate a third local force at the third PCB electrode and a fourth local force at the fourth PCB electrode;
use at least the first local force, the second local force, the third local force, and the fourth local force to calculate a force F exerted on the touchpad,
wherein a first current distance between the PCB and the base plate at the first PCB electrode is $d_{01}$, the first PCB electrode is spaced from a first spring electrode of the four spring electrodes by a first distance $d_1$, the second PCB electrode is spaced from a second spring electrode of the four spring electrodes by approximately the first distance $d_1$, a second current distance between the PCB and the base plate at the third PCB electrode is $d_{02}$, the third PCB electrode is spaced from a third spring electrode of the four spring electrodes by a second distance $d_2$ that is greater than $d_1$, and the fourth PCB electrode is spaced from a fourth spring electrode of the four spring electrodes by approximately the second distance $d_2$, and
wherein the first spring electrode, second spring electrode, third spring electrode, and fourth spring electrode are integral portions of the spring.

* * * * *